United States Patent
Jahan et al.

(10) Patent No.: US 10,856,395 B1
(45) Date of Patent: Dec. 1, 2020

(54) LIGHTING LOAD CLASSIFICATION AND DIMMER CONFIGURATION BASED THEREON

(71) Applicant: Leviton Manufacturing Company, Inc., Melville, NY (US)

(72) Inventors: A M Sarwar Jahan, Jamaica, NY (US); Wen Gu, Pasadena, CA (US); Tianjian Huang, Los Angeles, CA (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 0 days.

(21) Appl. No.: 16/444,788

(22) Filed: Jun. 18, 2019

(51) Int. Cl.
*H05B 47/175* (2020.01)
*G06N 20/00* (2019.01)

(52) U.S. Cl.
CPC ........... *H05B 47/175* (2020.01); *G06N 20/00* (2019.01)

(58) Field of Classification Search
None
See application file for complete search history.

(56) References Cited

U.S. PATENT DOCUMENTS

| | | | | |
|---|---|---|---|---|
| 9,184,590 | B2* | 11/2015 | Testani | H02J 3/00 |
| 2019/0245457 | A1 | 8/2019 | Telefus et al. | |
| 2019/0386883 | A1* | 12/2019 | Bhat | H04L 41/0803 |

OTHER PUBLICATIONS

Wilkins, Arnold et al. (2010). LED lighting flicker and potential health concerns: IEEE standard PAR1789 update. 2010 IEEE Energy Conversion Congress and Exposition, ECCE 2010—Proceedings. 171-178. 10.1109/ECCE.2010.5618050.
Rand, Dustin et al.(2007). Issues, Models and Solutions for Triac Modulated Phase Dimming of LED Lamps. PESC Record—IEEE Annual Power Electronics Specialists Conference. 1398-1404. 10.1109/PESC.2007.4342199.
"Python—Download the latest version for Windows" Retrieved on Apr. 29, 2019 from the Internet URL: <https://www.python.org/downloads/>, 3 pgs.
"TensorFlow 2.0 Alpha Is Available" Retrieved on Apr. 29, 2019 from the Internet URL: <https://www.tensorflow.org/install/install.windows>, 3 pgs.
International Search Report and Written Opinion for PCT/US2020/070050 dated Jun. 19, 2020, pp. 1-11.

* cited by examiner

*Primary Examiner* — Amy Cohen Johnson
*Assistant Examiner* — Jianzi Chen
(74) *Attorney, Agent, or Firm* — Matthew M. Hulihan; Heslin Rothenberg Farley & Mesiti PC

(57) ABSTRACT

A machine learning model for classifying different lighting loads based on properties of electrical current through the loads is built. The model is applied to electrical data gathered based on powering a target lighting load in order to classify the load. Based on load classification, operating parameter(s) to control operation of a dimmer to control power to the load are selected and the dimmer is configured with the selected parameter(s) to achieve desired dimmer operation in dimming the load.

18 Claims, 19 Drawing Sheets

LIGHTING LOAD CLASSIFICATION AND DIMMER CONFIGURATION BASED THEREON

BACKGROUND

Appropriately configuring dimmer operating parameters to avoid flicker and other issues when dimming light-emitting diode (LED) and other lighting loads can be a resource and time-consuming activity. In one approach, an application engineering lab tests each revision of firmware of a given dimmer with multiple different lighting loads, some or all of which may be different types of LED lamps. As LED lamps become more common adopted, the database of LED lighting loads and their compatibility grows. This necessitates re-testing of previous LED compatibility results, consuming significant time and resources. Even when a dimmer manufacturer has an extensive testing plan in place for a given dimmer, its customers can still experience flickering, for instance because of a low quality LED lamp or because the given lamp type was not in the test plan for the particular dimmer.

SUMMARY

Shortcomings of the prior art are overcome and additional advantages are provided herein.

In one embodiment, a dimmer is provided for controlling conduction of a supply of power to a lighting load. The dimmer includes a line input terminal and a load output terminal. The line input terminal is configured to be electrically coupled to the supply of power, and the load output terminal is configured to be electrically coupled to the lighting load. The dimmer also includes a switching circuit electrically coupled in series between the line input terminal and the load output terminal, the switching circuit configured to be selectively controlled between an ON state and an OFF state, a memory, and a processing circuit in communication with the memory. The dimmer is configured to perform a method that includes obtaining a machine learning model, the machine learning model configured for classifying lighting loads into a plurality of different lighting load classes based on properties of electrical current through the lighting loads. The method also includes, based on conducting the supply of power to the lighting load, obtaining electrical current data representing properties of electrical current through the lighting load over a duration of time, applying the machine learning model, using the obtained electrical current data representing properties of electrical current through the lighting load, to classify the lighting load, and performing processing based on the applying, where the performing processing includes configuring the dimmer with one or more dimmer operating parameters that control operation of the dimmer.

In another embodiment, a dimmer is provided for controlling conduction of a supply of power to a lighting load. The dimmer includes a line input terminal and a load output terminal. The line input terminal is configured to be electrically coupled to the supply of power, and the load output terminal is configured to be electrically coupled to the lighting load. The dimmer also includes a switching circuit electrically coupled in series between the line input terminal and the load output terminal, the switching circuit configured to be selectively controlled between an ON state and an OFF state, a memory, and a processing circuit in communication with the memory. The dimmer is configured to perform a method that includes, based on conducting the supply of power to the lighting load, obtaining electrical current data representing properties of electrical current through the lighting load over a duration of time. The method also includes sending the electrical current data to a remote entity, and, based on a classification of the lighting load, the classification being based on the sent electrical current data, configuring the dimmer with one or more dimmer operating parameters that control operation of the dimmer.

In a further embodiment, a computer system is provided that includes a memory and a processing circuit in communication with the memory. The computer system is configured to perform a method that includes maintaining a machine learning model, the machine learning model configured for classifying lighting loads into a plurality of different lighting load classes based on properties of electrical current through the lighting loads. The method also includes obtaining, from a dimmer, electrical current data representing properties of electrical current through a lighting load over a duration of time, applying the machine learning model, using the obtained electrical current data representing properties of electrical current through the lighting load, to classify the lighting load, and performing processing based on the applying.

In yet another embodiment, a computer system is provided that includes a memory and a processing circuit in communication with the memory. The computer system is configured to perform a method that includes obtaining a set of electrical current data representing properties of electrical current through each lighting load of a collection of different lighting loads. The method also includes building a machine learning model using a machine learning algorithm and the obtained set of electrical current data. The machine learning model is configured for classifying lighting loads into a plurality of different lighting load classes based on properties of electrical current through the lighting loads. The building includes training the machine learning model using at least the obtained set of electrical current data. The method further includes sending the machine learning model to a dimmer for lighting load classification.

Methods and computer program products for performing aspects described herein are also provided. Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
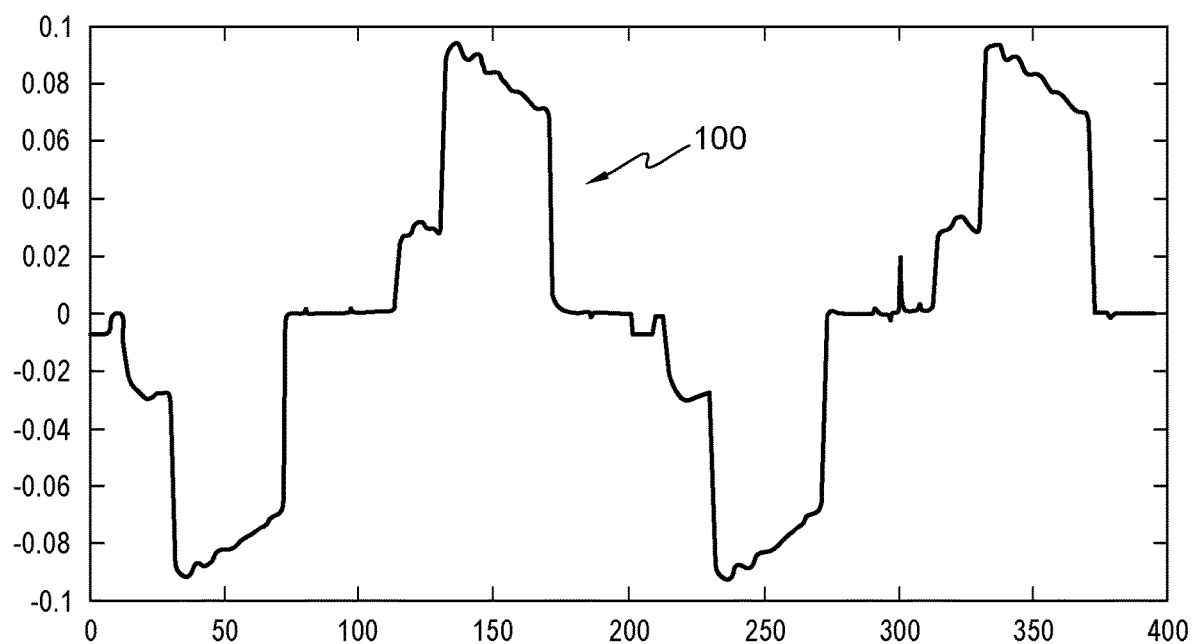
FIG. 1A depicts an example current waveform.

Described herein are approaches for classifying lighting loads and configuring dimmer operation based thereon. Machine learning is used to develop an algorithm for classification of a lighting load (also referred to herein as load, bulb, or lamp). The classification is made using a machine learning model, sometimes also referred to as a "classification model", "classifier", or just "model". The model can be built using data captured using known lighting loads, for instance known LED and other types of lamps that exist in the marketplace. The data collected is, in examples, electrical performance data, for instance measurements of current through the load for lamps connected to line power and/or clean power (absent noise). In some examples, additional data, for instance light output data, may help to further characterize the lighting load for classification purposes and/or for informing appropriate operating parameters for dimmer configuration.

An adaptive algorithm will allow a dimmer to optimize its drive circuitry for desired dimmer operation once load type has been identified. An example optimization may be one that minimizes/eliminates flicker on the lighting load connected in an end-user installation. Certain loads may be more prone to flicker under normal or default dimming operation. Classifying the lighting load enables the selection of parameters tailored for desired dimmer operation when dimming loads of that class. If the load type/class is known, the dimmer can be configured with the appropriate dimmer operating parameters to control operation of the dimmer, and the dimmer operating parameters can be selected based on the automatic classification of an installed lighting load, as classified by the model. This can facilitate production and provision of dimmers compatible with almost any of various different lighting loads, including various different LED load types. Meanwhile, it provides benefits on the dimmer production side in that it reduces or eliminates the burden of testing off-the-shelf lighting loads for compatibility with a produced dimmer.

A high-level example approach in accordance with aspects described herein follows a process that builds an appropriate machine learning model, trained and refined to relate current waveform (and optionally other measures, such as light output) data to flicker decisions for different lamps. The model can be tested using data from other lamps to verify that the model adequately predicts lamp type and therefore whether flicker or other performance issues may result under dimming operation.

Thus, the machine learning model can be configured for classifying lighting loads. The model may include a plurality of different lighting load classes that are identified based on properties of electrical current through lighting loads. The model is trained, and then tested, using electrical waveform data from lamps of different types. The electrical waveform data can be measurements of current through the load when the dimmer conducts a supply of power (dimmed cycles or full cycles) to the load. Once the model is trained, it is tested with new/other data to see whether, and how effectively, it classifies lamps. The model can therefore be used to detect different types of lamps, for instance LED, incandescent, and compact fluorescent (CFL), by implementing classification using the model in hardware. Hardware is or includes the dimmer itself and/or a remote server or other system in communication with the dimmer. Aspects described herein can successfully, and with a high degree of accuracy, classify lighting loads into different classes, including, in some examples, classes based on the internal circuitry of different loads of a same load type (e.g. LED), based on electrical performance properties of loads.

Various options are possible for the particular device(s) that build the model, train the model, and/or apply the mode to classify a given lighting load. In a particular example, a dimmer installed in-situ and coupled to a target lighting load classifies the load using the model, selects the appropriate dimmer operating parameters to control operation of the dimmer given the result of the classification, and configures the dimmer with those parameters. In that particular example, the dimmer can receive a trained model from another computer system, such as a remote server or other remote entity, a user device, for instance a mobile device, or any other computer system. The remote entity may be a system that has built and trained the model, or may be a different system, for instance one that obtains a trained model. In another example, the building, training, and applying the model are all performed by one or more remote entities remote from the dimmer. In that scenario, an indication of the class and/or desired operating parameters are sent to the dimmer for implementation of the appropriate parameters thereon. Other options are possible and are described herein.

The dimmer may have a network connection that enables the dimmer to communicate across one or more network(s), for instance local area network(s), or wide area network(s), such as the Internet. In some embodiments, the dimmer sends captured electrical data to a remote device to classify the load that the dimmer powered to obtain the current data. Additionally or alternatively, the send electrical date may be used to expand a training dataset for the more. Such data can be sourced from many dimmers installed in the field in order to expand the training dataset further. The model could be retrained periodically or aperiodically to refine the model, augment or change the classes, and the like, all with the aim of improving the model's accuracy. Updated models can be maintained on a remote entity for later classification and/or pushed to dimmers via an update, such as part of a firmware update.

In examples in which a dimmer stores and applies a model to sampled electrical data, the dimmer could reach out to a remote entity to use an updated model if it exists. This could be prompted based on an unsuccessful attempt to classify a given lighting load. The model may include an 'unknown' or 'default' category, for instance, selected when the model is unable to confidently classify a lighting load type into one of the well-defined classes. In these cases, the dimmer could provide the data to the remote entity for classification of the load using the updated model, or could reach out to the remote entity to retrieve the updated model so that the dimmer itself applies the model to classify the load.

Whether a model is stored on and applied by a dimmer as opposed to a remote entity to classify a lighting load may be based on any of various considerations. The dimmer is to have sufficient compute resources (e.g. processor/processing circuit, memory, etc.) to perform the classification within an acceptable amount of time. Dimmers with sufficient resources are candidates to hold and apply the model. Dimmers without such resources may be configured to collect the electrical data, send it to a remote entity for classification of the lighting load, and receive a response from the remote entity that indicates the model or appropriate parameters to use. It may be desired not to distribute the model to devices in the field, and instead retain and apply the model on the backend.

Various terms used herein are defined/explained as follows:

Activation Function: The function that defines output of a node given input(s) thereto; also known as "transfer function".

Compact Fluorescent Light (CFL): Type of light/lighting load; designed as a replacement to common incandescent bulbs.

Driving Circuit: An electrical circuit used to control another circuit or electrical component.

Electronic Low Voltage (ELV): A low voltage power supply using solid state converters.

Fast Fourier transform (FFT): An algorithm that samples a signal over a period of time (or space) and divides it into its frequency components.

Flicker: A measure of light variation that is often applied to periodic oscillations, modulation as variation in luminance as a proportion of the average luminance.

Hidden Layer: A layer of a neural network, the layer having neurons and sitting between input layer(s) and output layer(s).

Incandescent Lamp: Light with a filament that glows when heated to produce light; this is a purely resistive load.

LabVIEW: Software offered by National Instruments Corporation for visualizing hardware configuration, measurement data, and debugging.

Machine Learning: A field of computer science that uses statistical techniques to give computer systems the ability to learn with data without being explicitly programmed.

Magnetic Low Voltage (MLV): A low voltage power supply using a magnetic ballast.

MATLAB: A desktop environment offered by Math-Works, Inc. (Natick, Mass., USA) and tuned for iterative analysis and design processes with a programming language that expresses matrix and array mathematics directly.

myDAQ: Data acquisition device offered by National Instruments Corporation (Austin, Tex., USA) featuring eight commonly used plug-and-play computer-based lab instruments based on LabVIEW, including a digital multimeter (DMM), oscilloscope, and function generator.

Neural Network: A network of neurons modeled on the human brain and nervous system.

Neuron: Nodes of the neural network.

Light-Emitting Diode (LED): A two-lead semi-conductor light source that emits light when activated.

Power Inverter: An electronic device that converts direct current (DC) to alternating current (AC).

TensorFlow: An open source software library for high performance numerical computation, allowing easy deployment of computation across a variety of platforms (CPUs, GPUs, TPUs), and from desktops to clusters of servers to mobile and edge devices.

Topology: The form taken by the network of interconnections of the circuit device.

TRIAC Dimmer: Dimmer designed for resistive loads using pulse-width modulation.

For machine learning model development, training, and testing purposes, a database of electrical data is built in accordance with aspects described herein. The electrical data includes current waveforms for each bulb of a collection of bulbs. In some examples, the current waveforms are collected for the database without the effects of a dimmer, i.e. without powering the bulb via a dimmer.

In an example to facilitate the data acquisition process, a graphical user interface (GUI) is designed in an environment such as LabVIEW to include, as examples, (i) a sampling rate/period input for a user to specify the sampling rate, (ii) a trial number input for a user to specify a number of trails, (iii) a real-time voltage plot displaying voltage in real-time, (iv) a real-time current plot displaying current through the load in real-time, (v) 'start test' and 'stop test' buttons to start and stop the testing, respectively, (vi) a test finished indicator to indicate when the data acquisition is finished, and (vii) a 'save' button to export the sampled data to a file, such as a .txt or other type of file. The interface is used to sample current values of a current waveform describing current levels through the load.

The sampling occurs based on conducting a supply of power to the different loads for which electrical current data is being acquired. The device conducting the power could be any of various types of devices, for instance dimmer(s) or otherwise. The electrical current data being obtained represents properties of electrical current through the lighting loads over the duration of the test.

While the measured voltages across the loads are roughly equal and consistent with the supplied AC power, e.g. of 110V, the current data can be useful for differentiating between the loads and load types.

In an example database built in accordance with aspects described herein, the values for current waveforms of 19 bulbs were included. Of the 19 bulbs, 16 were LED bulbs, 2 were CFLs, and 1 was an incandescent bulb. They were all sampled at 200 samples per period for 2 periods. A period was 1 second (corresponding to 60 Hz AC). Each current waveform is made of 400 samples (200 samples per period*2 periods=400 samples).

Both voltage and current data were recorded for the two periods at 200 samples/period, resulting in 400 data points (200 voltage, 200 current) per "trial". Recording for more than one period is done to verify periodicity, so that distortions or other abnormalities occurring in one period are not taken to be reflective of normal operation.

The sampling frequency and Nyquist frequency are indicated as follows in Equations 1 and 2, respectively:

$$f_{sampling} = 200\frac{\text{samples}}{\text{period}} * 60\frac{\text{periods}}{\text{second}} = 12,000\frac{\text{samples}}{\text{second}} \quad \text{(Eq. 1)}$$

$$f_{Nyquist} = 60\text{ Hz} * 2 = 120\text{ Hz} \quad \text{(Eq. 2)}$$

The sampling frequency is an order of magnitude greater than the Nyquist frequency. This provides a confidence that the true shape of the entire waveform (i.e. including unsampled values) is represented by the sampled values.

In an example structure for the database, the data is stored in a 400×2 array—one column for voltage values and another column for current values. Ten consecutive trials are taken to collect a large dataset for machine learning purposes, resulting in a 400×20 array, or 8,000 total sample points, 4,000 of which are current values and 4,000 of which are voltage values. The array is then exported into a .txt or other file, which can be plotted in software such as MATLAB.

Since the sampling frequency is 12,000 per second, and current and voltage are sampled concurrently, the data for all 10 trials (assuming continuous) is gathered in about 0.33 seconds.

Figure 1B:
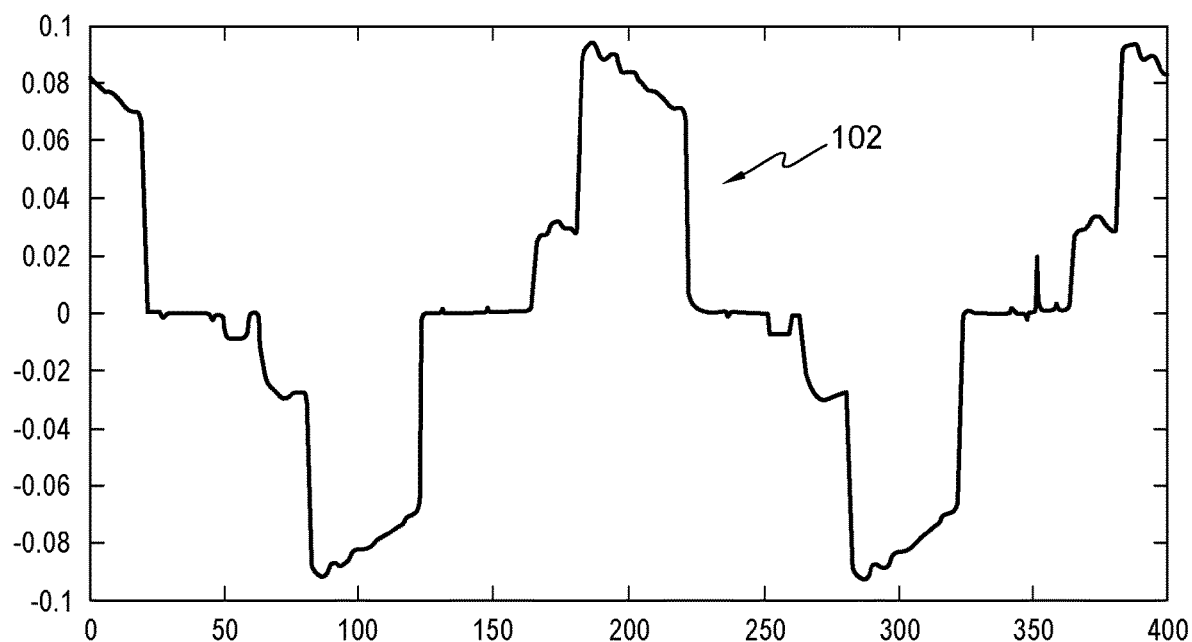
FIG. 1B depicts the example current waveform of FIG. 1A with a phase shift applied thereto.

It may be difficult for current waveforms from the same bulb/bulb type taken at different times to be compared if a phase shift is present. Identical current waveforms where sampling starts and stops at different angles of the phase will look different, albeit only shifted by some phase angle. A visualization of this is shown in FIGS. 1A-1B, where FIG. 1A depicts an example current waveform and FIG. 1B depicts the example current waveform of FIG. 1A with a phase shift applied thereto. The waveforms are taken of current through the same bulb.

In FIG. 1A, current waveform 100 is shown along x and y axes, where the x-axis indicates the sample number and the y-axis shows the current value. The sampling begins very near the zero-crossing of the AC power. FIG. 1B shows current waveform 102 though the same load, with the x-axis again indicating the sample number and the y-axis showing the current value. A 90° phase-shift is applied to the waveform 100 of FIG. 1A to obtain waveform 102 of FIG. 1B. The sampling begins at 90° of the full phase (approximately half way through the positive half-cycle of the AC power).

While the human eye can observe that the two current waveforms 100 and 102 are the same because 102 is just a shifted version of 100, a computerized comparison, for instance comparing current values for the same sample number, would result in a false differentiation. Correlating samples across periods would be problematic. To account for the possibility that the start and stop times (phase angles) for sampling gathering may not be consistent, a current waveform database with possible shifts is created based on the initial dataset of sampled current level values along the sampled current waveforms. The initial dataset—the electrical data actually gathered from sampling against the bulb—is augmented by applying a phase shift to the sampled current level values to produce another dataset. The current level values at corresponding shifted angles of the phase are indicated in the database. This is iterated through a collection of phase shifts (with each shift being a sequentially next 1.8° shifted from the prior shift) and the new current values are stored. This can be implemented by programming in, e.g. MATLAB, to create different phase shifts of a single current waveform.

Figure 2:
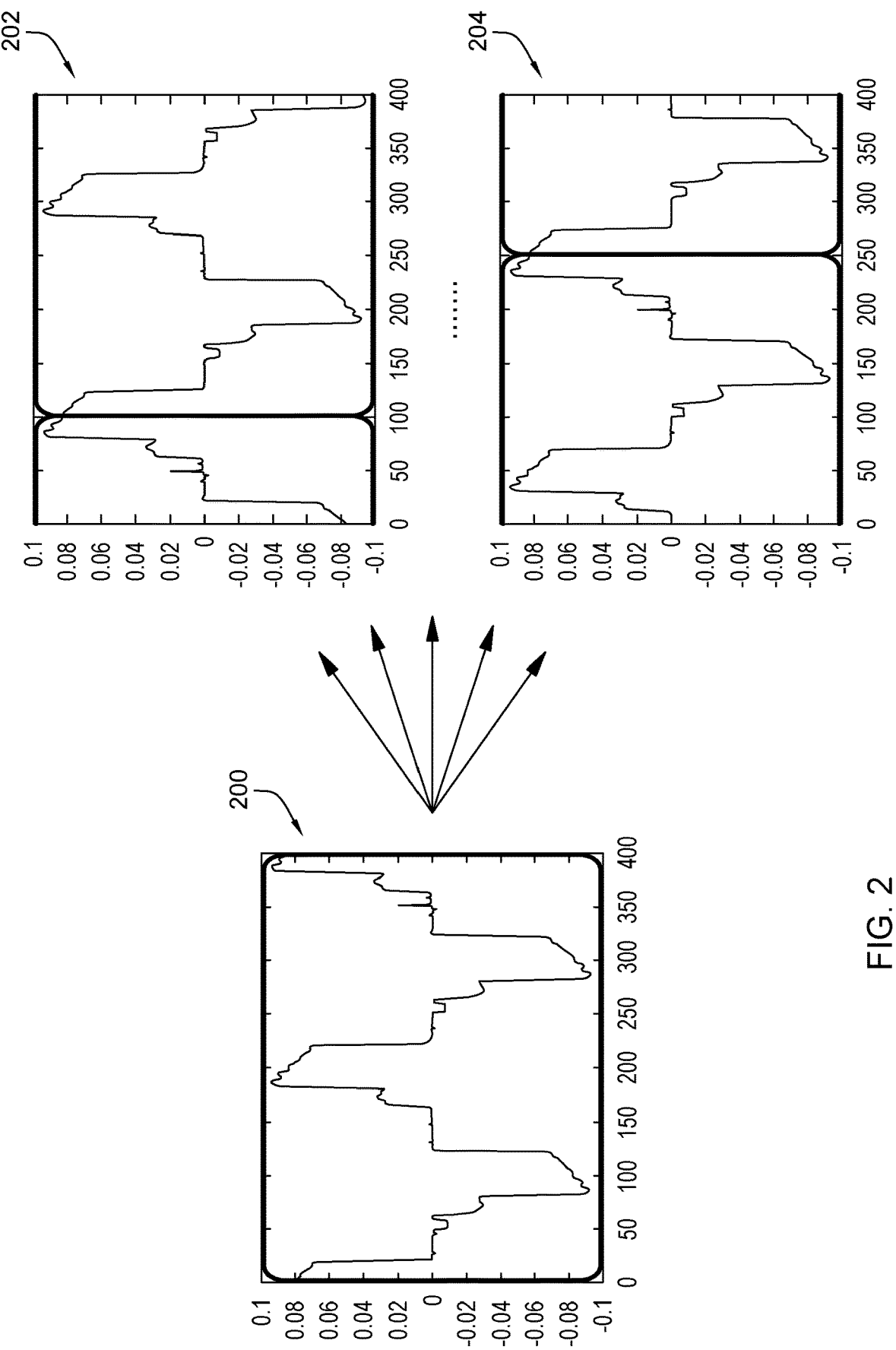
FIG. 2 illustrates the iterative application of a phase shift to a current waveform in the augmentation of an initial dataset of electrical data, in accordance with aspects described herein.

FIG. 2 illustrates the iterative application of a phase shift to a current waveform in the augmentation of an initial dataset of electrical data, in accordance with aspects described herein. In FIG. 2, the collected current waveform is shown by 200, where the x-axis indicates the sample number and the y-axis again indicates the current value for each sample. The program, e.g. one written in MATLAB, takes the single current waveform of 200 and duplicates the waveform with a 1.8° phase shift, or a shift of one sample (360 degrees/200 samples=1.8 degrees). The process then repeats 399 times. This results in 400 versions of the same current waveform—1 original and 399 shifted versions. 202 and 204 show two example shifts, with 202 showing the waveform of 200 shifted by approximately 105 samples (189°) and 204 showing the waveform of 200 shifted by approximately 252 samples (453.6°).

Figure 3:
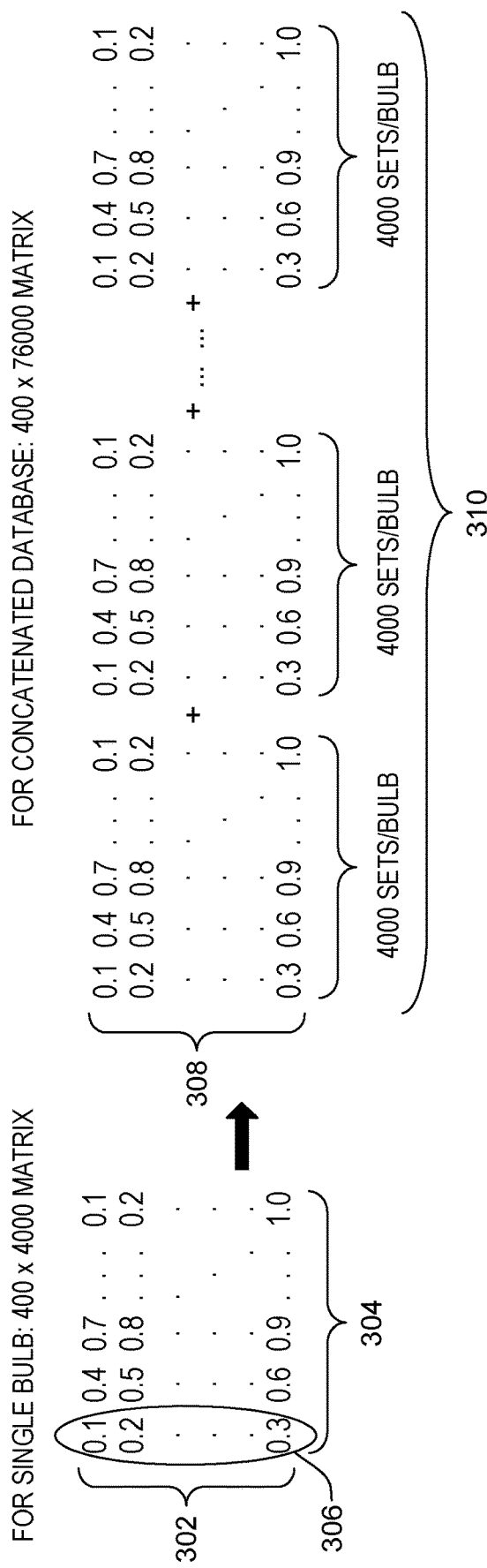
FIG. 3 depicts an example database construction and format for electrical current data, in accordance with aspects described herein.

FIG. 3 depicts an example database construction and format for electrical current data, in accordance with aspects described herein. The actual sample values are for illustration and are not representative of actual sampled current values.

Initially, for a single bulb, a 400×4,000 matrix is established. The height (302) of each column reflects 200 samples/period over 2 periods=400 samples. 306 reflects the 400 sampled values of a single trial. The collection of 400 values is also referred to as a "set". Each trial is augmented using the phase shift approach above. Phase shifts are applied to produce data for 400 waveforms—1 sampled waveform and the 399 shifts—totaling 400 "sets" per one trial. Since there are 10 trials per bulb, this is repeated 9 times for a total of 4,000 sets of data (reflected by 304) for this single bulb.

This is repeated for multiple different bulbs, and, ideally, bulbs of differing bulb types (e.g. LED, CFL, incandescent). 310 reflects a concatenated database as a 400×76,000 data point matrix. Single bulb data (400×4,000) for 19 different bulbs is concatenated to produce the (400×4,000)*19)=400× 76,000 data point matrix.

Time-domain and/or frequency-domain database(s) can be constructed for training and testing neural networks to classify the types of bulbs. Time-domain refers to a variation in amplitude over time, while frequency-domain refers to a frequency of an event (e.g. peak) over time. The conduction can be performed in any desired software package. Examples includes the TensorFlow, MATLAB, and/or PyTorch software packages.

Figure 4A:
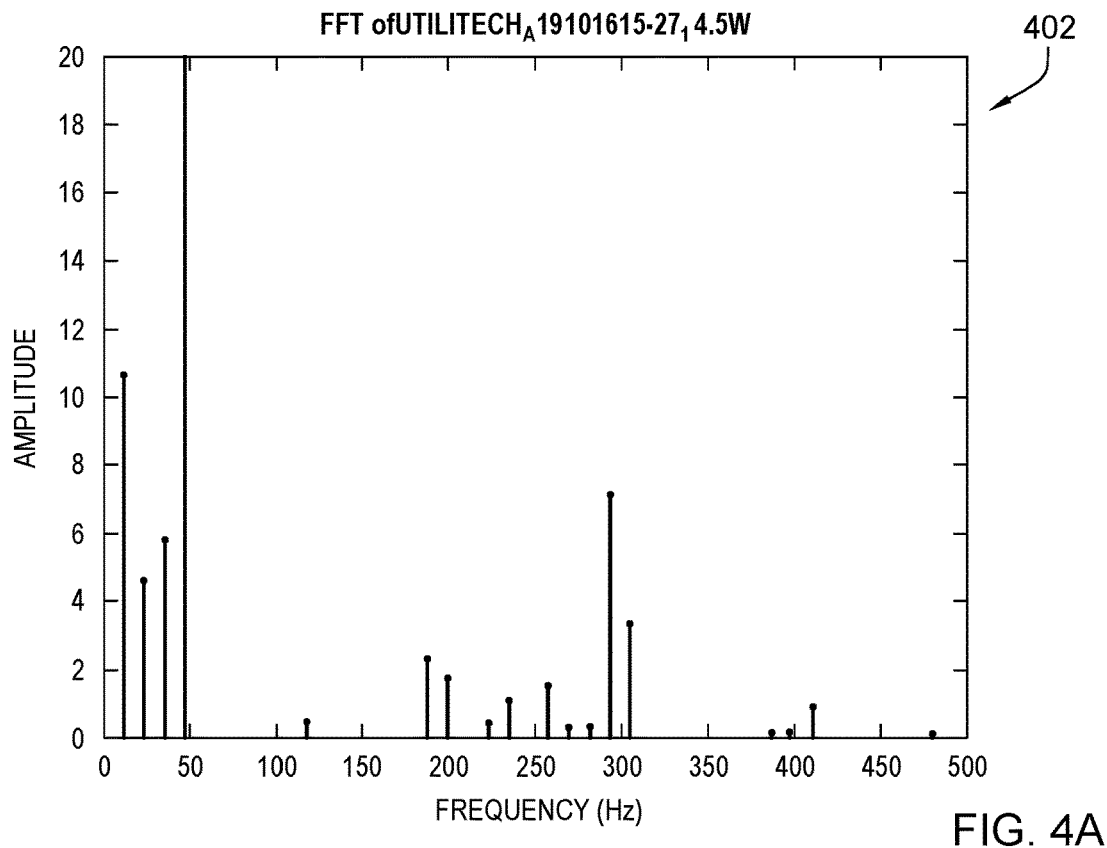
FIGS. 4A and 4B depict example single-sideband fast Fourier transforms for two different LED lamp types.
Figure 4B:
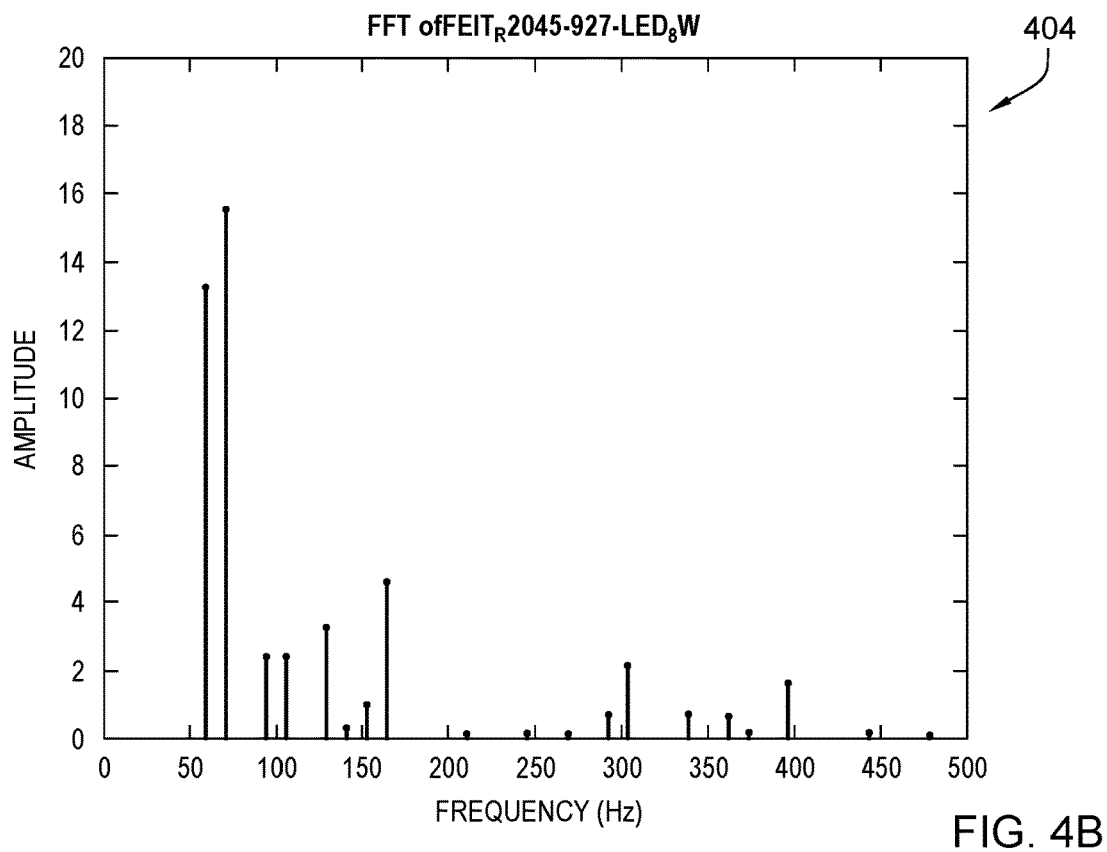

In an example, a single-sideband fast Fourier transform (FFT) was performed on each time-domain data set. FFT practice is known to those having ordinary skill in the art. FIGS. 4A and 4B depict example single-sideband fast Fourier transforms for two different LED lamp types. FIG. 2A shows the results 402 of an FFT of a tapped-inductor (TI) buck ("tapped-buck") converter type LED lamp, while FIG. 2B shows the results 404 of an FFT of a buck converter type LED lamp. On most occasions, the buck converter type LED displayed significantly more power in the lower frequency range (<60 Hz) than the tapped-buck converter type LED.

In an example, the neural network(s) are trained and tested in both time-domain database and frequency-domain database data. A benchmark of different parameters, such as number of neurons, database types (frequency-domain or time-domain), and platforms (e.g. TensorFlow or MATLAB), was performed. According to performance requirements (e.g. accuracy, running time, number of neurons used, etc.), and as explained in further detail below, the combination of these parameters that constructs the neural network with optimal performance was found to include three neurons in one hidden layer, trained and tested using the frequency domain database data, and built in TensorFlow.

Data of current waveforms that includes both captured current waveform data and the augmented data resulting from the phase shifts were built into one or more databases for training/testing purposes. In some examples, there are several databases covering both time domain and frequency domain data, and optionally with altered sampling rates or other parameters.

Performance of LED and other bulb types (incandescent, CFL) were classified and then trained using a TensorFlow machine learning algorithm. Input for the algorithm included current waveform data from the database(s) explained above and an output vector resulted that indicated seven categories to which each bulb (via its associated input data) could be assigned. These categories include (i) four classes for four different types of LED lamps, corresponding to four different driving circuits in those LED lamps, (ii) an incandescent class, (iii) a CFL class, and (iv) an 'unknown' class. The unknown classification is intended for results that cannot be confidently placed into one of the well-defined classes. It is typical for the application of a machine learning model to output a confidence level of the classification to each of one or more classes. If the confidence level for all other classes is below a threshold, 20% for instance, the bulb could be classified to the 'unknown' class.

The usefulness of the classification is premised on a hypothesis that different load types—LED, CFL, incandescent, etc.—contain different electrical components that affect their electrical behavior. Electrical behavior includes current through the load, light output, and flicker behavior, as examples.

Four different converter circuits commonly drive different LEDs. These include: buck converter, buck-boost converter, tapped-buck converter, and flyback converter. Machine learning models built in accordance with aspects described herein designate a class for each of these four drive circuits. To the extent that any other converter circuits or other distinctive circuitry exists as between LED lamps, corresponding additional classes could be incorporated into the model. A focus is placed on LED drive circuits in particular because flickering experienced with other lamp types tends to reflect a problem with the dimmer rather than the bulbs themselves. Incandescent lamps, for instance, are simple resistive loads. LED performance, however, can vary based on the quality of components, manufacturer, actual components use, and other factors that may matter more than with other lamp types.

Figure 5A:
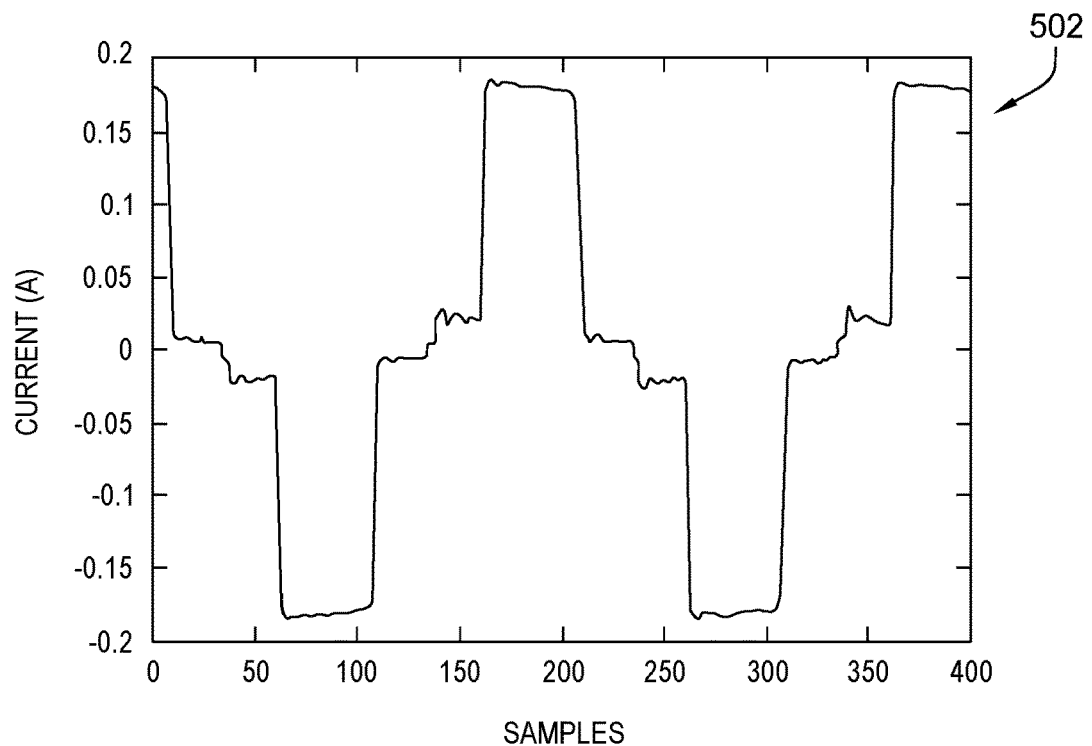
FIGS. 5A and 5B depict example current waveforms through two different LED lamp types.
Figure 5B:
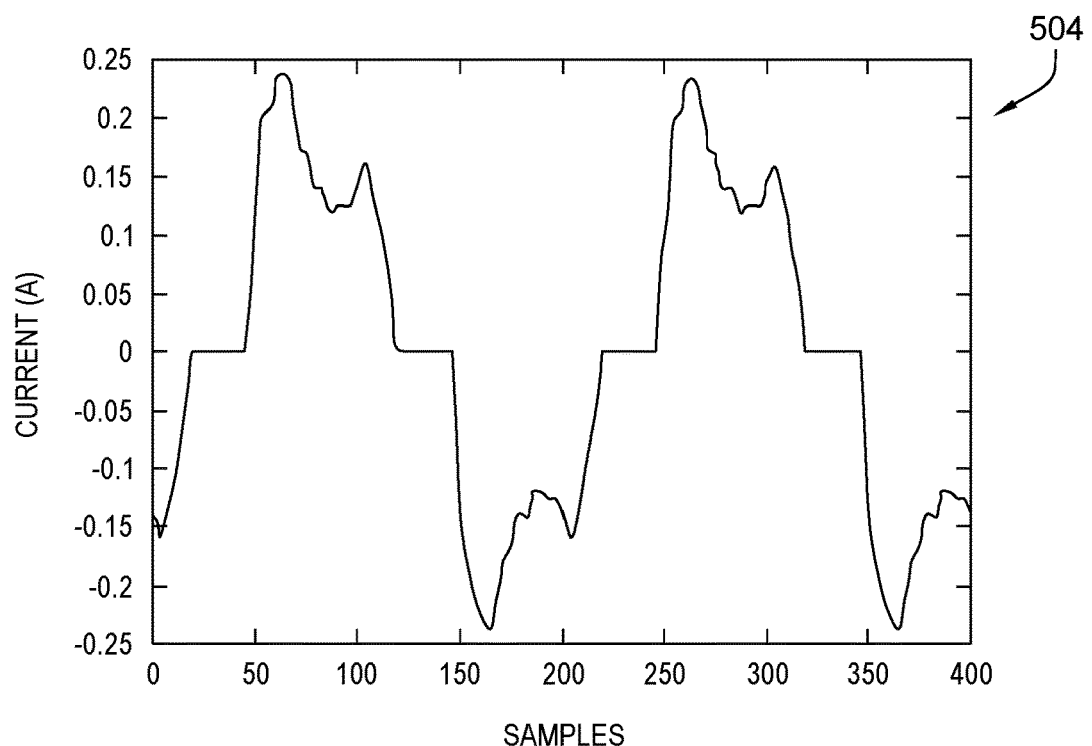

FIGS. 5A and 5B depict example current waveforms through two different LED lamp types, illustrating difference in electrical performance as between the two types. The current waveforms 502 of FIG. 5A and 504 of FIG. 5B each show current values (y-axis) for a single trial of 400 samples (x-axis). FIG. 5A is for a tapped-buck converter LED ("Type 1") and FIG. 5B is for a buck converter LED ("Type 2").

The two waveforms 502 and 504 display two distinctly different shapes. The current is relatively constant at the peak for the Type 1 LED, but decays for the Type 2 LED. The wattage affects the amplitude of each wave, where amplitude correlates to wattage value. A similarity between the two is the periodicity; they are both distorted versions of the sinusoidal input. In order to determine if the differences in waveforms is due to two different circuits composed of different discrete elements or the same circuit composed of the same discrete elements with different values, a bulb decomposition—a manual disassembly—was performed, and the two different circuits were found.

A typical tapped-buck converter contains a stepdown autotransformer for energy transfer purposes, a switching circuit, and storage elements such as capacitors and inductors. A typical buck converter contains a capacitor, inductor, or combination of both. In the case of Type 1, the tapped-buck LED, there were three capacitors.

The two circuits directly corresponded to the shape of the waveforms. Thus, the differences in LED driving circuits were the cause of the significant differences in the shape of the current waveform through the LED. One hypothesis based on the teardown is that the poorer electrical performance of the buck converter (Type 2) in terms of flicker results because of the fewer number of components, making it less expensive to produce.

As noted, the seven classifications into which an example model will classify data of the example current waveform database are:

Buck Converter (LED);
Tapped-Buck Converter (LED);
Buck-Boost Converter (LED);
Flyback Converter (LED);
Incandescent
CFL; and
Unknown The types of loads that are potentially encountered for purposes of classification using the model would typically dictate the particular classes to be included in the model. If only LED loads are expected to be encountered and classified, the classes could include: (i) a respective class for each potential type of LED drive circuitry, and (ii) an 'unknown', 'Default' or 'Other' class. However, because in the field it is foreseeable that other types of loads, e.g. incandescent or CFL may be encountered, it makes sense to include a discrete class for these types so as to avoid misclassification of them into an LED class or the 'unknown' class, for instance.

By the above, a database is built by the collection of actual current waveform data, followed by data preprocessing to, e.g., augment that data based on phase shifts and then apply FFTs to the time-domain data to produce frequency-domain data. By taking the fast Fourier transform of an 'input' variable and keeping the 'output' variable the same, a frequency-domain database is available.

Thus, at an initial stage, current waveform data for each of several bulbs is collected across multiple (e.g. 10 trials). The multiple trials may be continuous (chronologically adjacent) or non-continuous. Multiple trials may be taken to identify and potentially eliminate noise, if desired. Data processing takes the sampled values of the trails as input and shifts each trial data 399 times to obtain 400 current waveforms. The output of this processing is a file, e.g. a MATLAB*.mat file, that consists of 4,000 sets of current waveforms for the target bulb. This is done for each bulb of a test set, such that each .mat file corresponds to one bulb and includes 400 samples×4,000 sets of data. In a next stage, the data of the .mat files for the bulbs are concatenated together and labeled. By 'labeled' is meant that, for each set (e.g. group of 400, corresponding to a waveform) of data points, a label is associated with that set to indicate the bulb's class. This associates trail data to the actual, known classes of the training load types, to train of the model. The resulting data set, stored in one example as a MATLAB file, has two variables—one is the "input", and another is the "output". The input variable includes the concatenated data for the bulbs. The size for 'input' variable is 400 samples× 76000 sets (for a 19 bulb sample set). The 'output' variable contains the classes for current waveforms. Each current waveform is associated with only one class. The 'output' variable is in the size of 7 classes×76,000 sets, using the example number of classes and sample bulbs described herein. The row corresponds to the class of each current waveform. The column corresponds to the data of each current waveform. If current waveform in one column of 'input' is from the tapped buck converter LED, the output vector is "1 0 0 0 0 0 0", for instance. The comprehensive list of labels is shown in Table 1:

TABLE 1

| Input Waveform | Output Vector |
| --- | --- |
| Tapped-buck Converter | [1 0 0 0 0 0 0] |
| Buck Converter | [0 1 0 0 0 0 0] |
| Buck Boost Converter | [0 0 1 0 0 0 0] |
| Flyback Converter | [0 0 0 1 0 0 0] |
| CFL | [0 0 0 0 1 0 0] |
| Incandescent | [0 0 0 0 0 1 0] |
| Unknown | [0 0 0 0 0 0 1] |

Classes that are known but that have not yet been 'defined' in the sense that they have not yet been encountered in the trial data can be reserved using an 'undefined' vector in the table. If at a later time trial data is acquired for those classes, a definition of the class can be made. Additionally, current waveforms of unknown bulbs can be indicated in the database and labeled as such using the unknown label.

The 'unknown' classification can be used in situations where the confidence of a classification to any other class is sufficiently low. Undefined classes may be included in the model as a placeholder during training but without any of the training data being classified/labeled therein. Additionally or alternatively, in some examples, noise is introduced as the 'distribution' for those undefined classes, the noise being such that it would never be observed in an actual implementation of any bulb. The model would therefore not assign any bulb to that class. Then, once data on an undefined class is obtained, the noise can be removed and the model can be retrained incorporating that new data labeled for the previously undefined class.

For algorithms in machine learning, a multilayer perceptron can be used as a starting point. Since the current waveforms are differentiable by human eyes, a multilayer perceptron is complex enough to recognize the differences. A multilayer perceptron is a relatively simple network that requires less computational power than other networks. This enables models built on these simple networks to be used and applied by any range of processing devices, including processing circuits, e.g. microprocessor(s), that may be implemented in dimmers.

Figure 6:
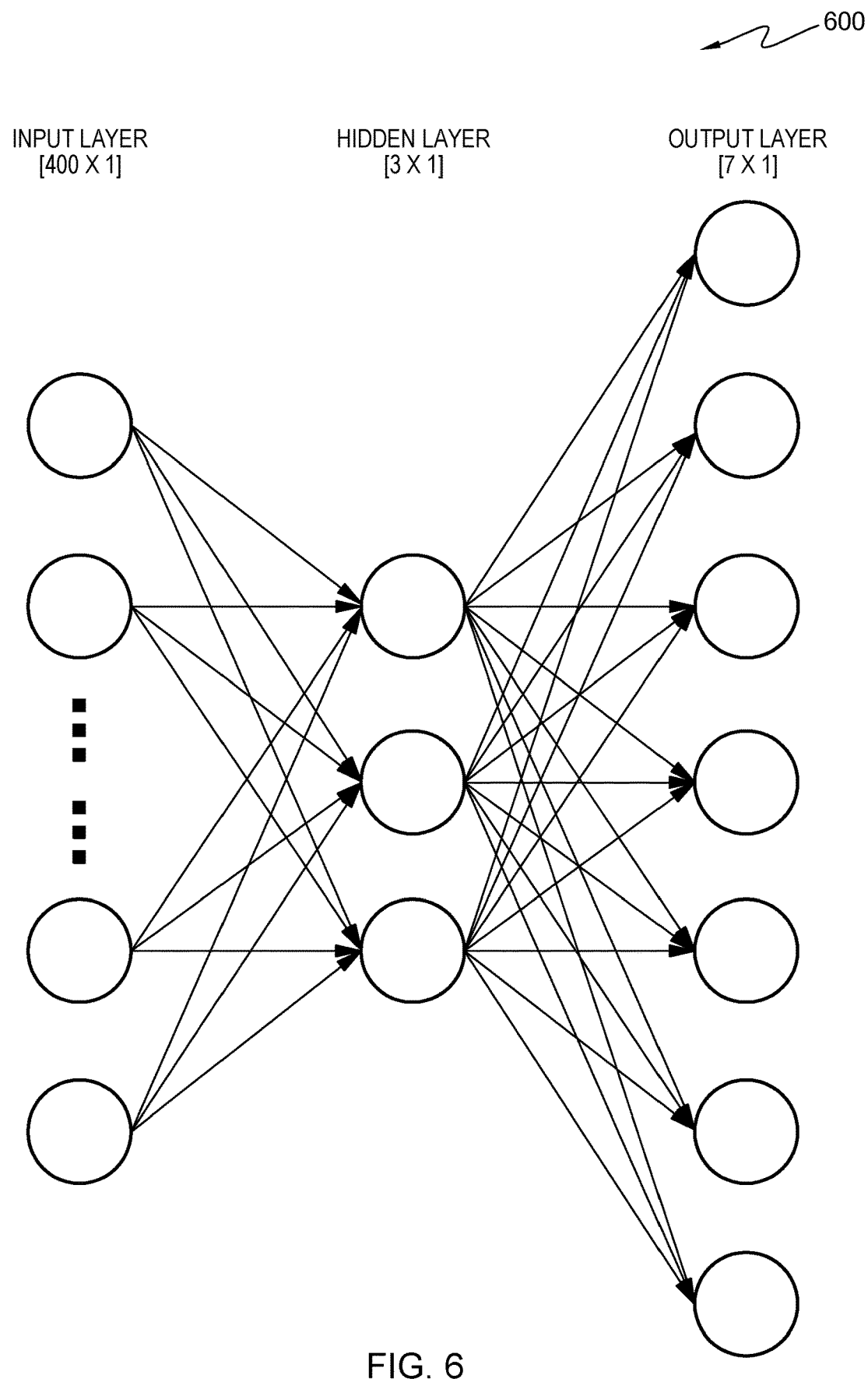
FIG. 6 depicts an example structure of a neural network in accordance with aspects described herein.

FIG. 6 depicts an example structure of a neural network in accordance with aspects described herein. Neural network 600 is an example multilayer perceptron, having one input layer with 400 neurons (also referred to as nodes), one hidden layer with 3 neurons, and one output layer with 7 neurons. The input is a 400×1 vector denoting the samples of a current waveform of two consecutive periods. The output is a 7×1 vector denoting the 7 classes defined above.

Neural networks with one hidden layer can be implemented in various software, include MATLAB and Tensor-Flow. Additionally, they can be trained based on either the time domain database or frequency domain database. The following describes benchmark results between (1) neural networks trained based on the time-domain database and (2) neural networks trained based on the frequency-domain database, in both MATLAB and TensorFlow. The phrases "model" and "neural network" are used interchangeably herein to refer generally to the construct that is applied to classify an input into an output.

Three factors considered during the benchmark process include accuracy, running time, and the number of neurons used in the hidden layer. Example running times presented below do not incorporate the computation time for the fast Fourier transforms, though the computation time to perform the FFTs could easily be determined and taken into account in calculations of expected running time of a neural network trained based on the frequency-domain database. With respect to the number of neurons used in the hidden layer, this number generally affects the complexity of the model. A higher number of neurons in the hidden layer(s) produces a more complex model that would generally take more time to classify inputs ("runtime") than models with fewer neurons. The advantage is that it generally increases accuracy to have more neurons in the hidden layer(s).

Accuracy is calculated based on the true positive rate that the trained neural network/model properly classifies the bulb types of the current waveform in the testing database. The testing database could be a subset, say 10%, of the overall database. In the examples herein, the testing database is 7,600 current waveforms, which is 10% of the 76,000 in the overall database, leaving 90% of the waveforms for training. Various neural networks were trained, and each included one hidden layer with a varied number of neurons in that layer. The average time of 100 trial classifications (reading the input and making the classification) was calculated and defined as the running time for the model.

Figure 7:
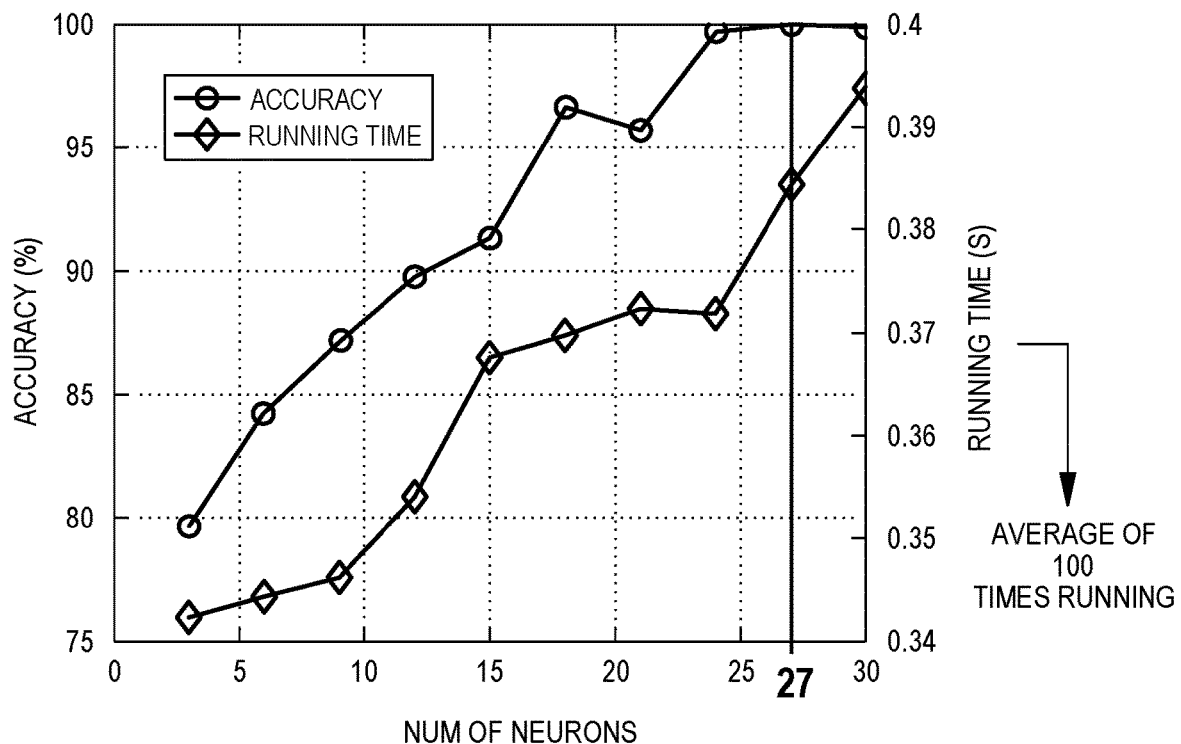
FIG. 7 depicts example performance of neural networks trained based on a time domain database, in accordance with aspects described herein.

FIG. 7 depicts example performance of neural networks trained based on a time domain database in accordance with aspects described herein. In this example the training was performed in MATLAB. The neural networks were implemented with one hidden layer that ranged from 3 to 30 neurons (along the x-axis) big. Each step increases the number of neurons by three. The accuracy over this span is plotted on the y-axis and increases from 80% to 99%, saturating at over 99% with 27 neurons. The running time increases from 0.342 seconds to 0.394 seconds. Based on this, desired performance may be with 27 neurons in one hidden layer, with a runtime of 0.385 seconds on the particular computer system performing the classification of the these trials.

Figure 8:
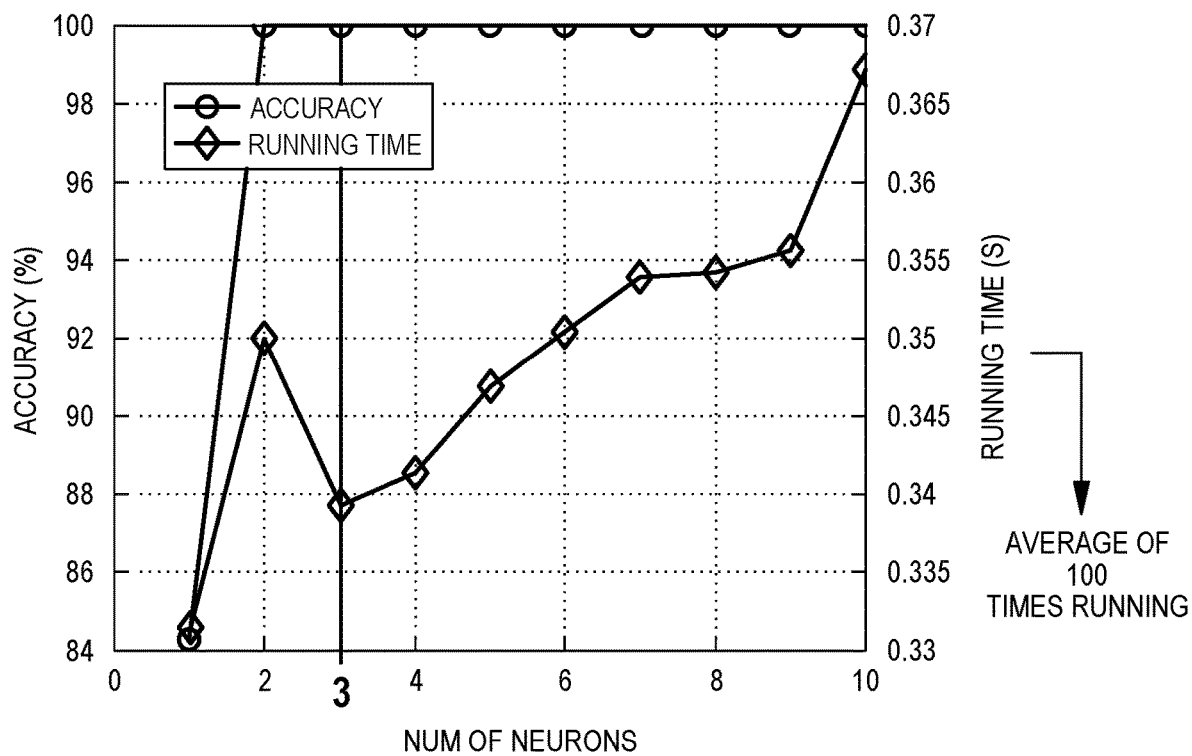
FIG. 8 depicts example performance of neural networks trained based on a frequency domain database, in accordance with aspects described herein.

FIG. 8 depicts example performance of neural networks trained based on a frequency domain database in accordance with aspects described herein, and again performed in MAT-LAB. The neural networks were implemented with one hidden layer that ranged from one to ten neurons (x-axis) big, and a step size of one neuron. The accuracy over this span (indicated on the y-axis) increases from 84% to 100%, saturating at 100% with two neurons in one hidden layer. The running time increases from 0.331 seconds to 0.365 seconds. A desired performance based on these results may occur with three neurons in one hidden layer, with an accuracy of 100% and a runtime of 0.340 seconds. There is an observable anomaly in the running time values in that the running time decreases when increasing from two neurons to three. Different activation functions could have different complexities, thus affecting running time. In some approaches, different activation functions of the neural network could be used/tested in the neural network and its overall performance assessed.

Thus, with the testing above using MATLAB, the performance of neural networks trained based on the frequency-domain data is better than that of neural networks trained based on the time-domain data in terms of the number of neurons used to achieve 100% accuracy and the running time. The neural network trained based on frequency-domain data with optimal performance can use only three neurons to reach 100% accuracy, which is far less than the number of neurons (27) used by the neural network trained based on time domain data to achieve a desired performance. In addition, the running time of the neural network trained based on frequency-domain data with the desired performance is around 0.340 seconds, which is slightly less than the running time of the neural network trained based on time domain data with desired performance, 0.385 seconds.

Figure 9:
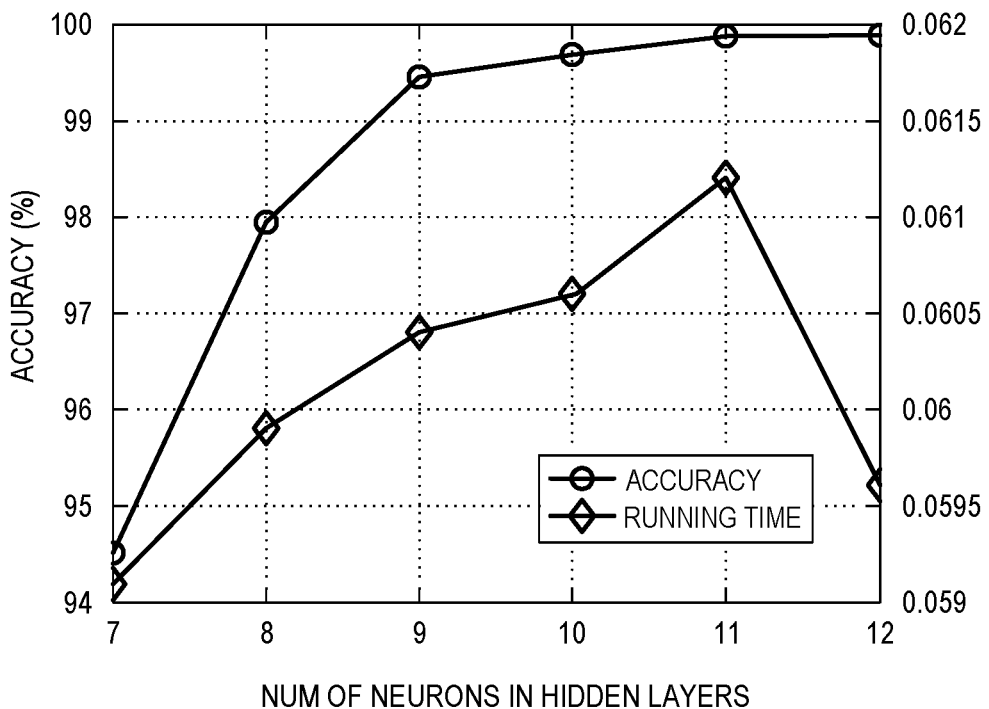
FIG. 9 depicts example classification performance using time domain data, in accordance with aspects described herein.
Figure 10:
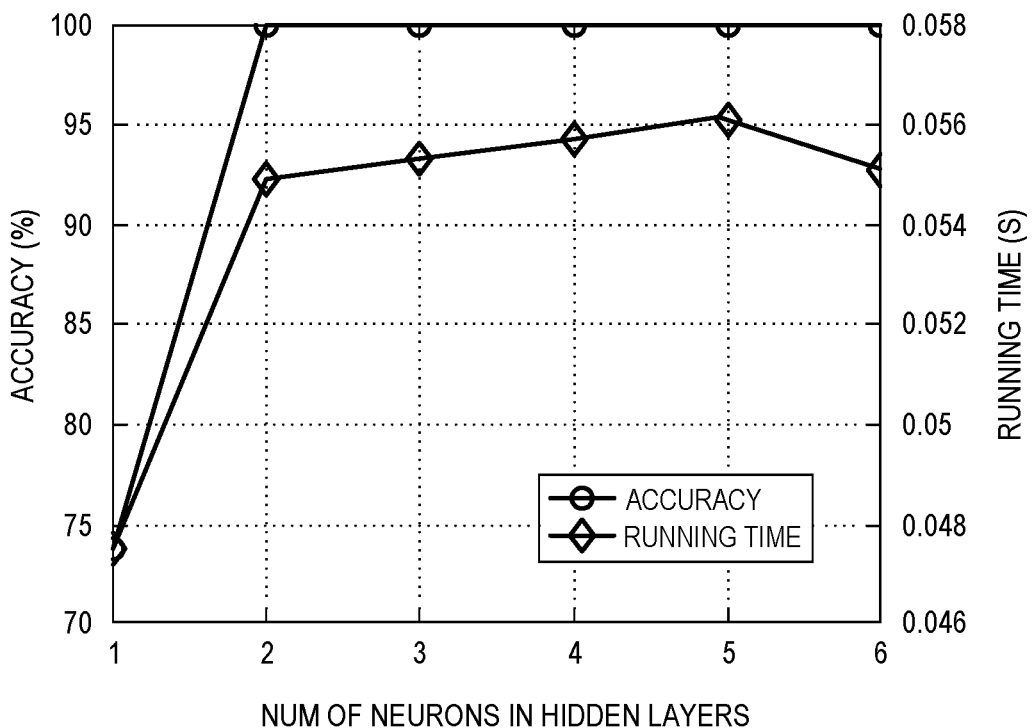
FIG. 10 depicts example classification performance using frequency domain data, in accordance with aspects described herein.

The training results using TensorFlow are shown in FIGS. 9 and 10. FIG. 9 depicts example classification performance using the time domain dataset, in accordance with aspects described herein. The neural networks were implemented with one hidden layer, ranging from 7 to 12 neurons (along the x-axis). Each step increases the number of neurons by 1. The accuracy over this span is plotted on the y-axis and increases from approximately 94.5% to >99%. The running time ranges from about 0.0592 seconds to about 0.0614 seconds. Although the accuracy increases with the number of neurons, the returns are diminishing. Based on this, desired performance may be with nine neurons, at a running time of 0.605 seconds.

FIG. 10 depicts example classification performance using frequency domain data, in accordance with aspects described herein. The neural networks were implemented with one hidden layer, ranging from 1 to 6 neurons (along the x-axis). Each step increases the number of neurons by 1. The accuracy over this span is plotted on the y-axis and increases from approximately 74% to >99%. The running time ranges from about 0.0475 seconds to about 0.056 seconds. Using the frequency-domain database, an accuracy of nearly 100% was achieved with two neurons. Based on this, a desired performance may be with 6 neurons, with a run time of 0.055 seconds.

For TensorFlow, performance in the frequency domain was better than that in the time domain in terms of fewer neurons and less running time. Table 2 below summarizes the performance comparison between the above results from MATLAB and TensorFlow:

TABLE 2

|  |  | MATLAB | TensorFlow |
|---|---|---|---|
| Running Time | Time Domain | 0.385 | 0.060 |
|  | Freq. Domain | 0.340 | 0.055 |
| Number of Neurons | Time Domain | 27 | 12 |
|  | Freq. Domain | 3 | 2 |

TensorFlow outperforms MATLAB in the aspect of running time and number of neurons in each layer. TensorFlow runs faster than MATLAB and consumes less computational power (fewer neurons) in this experiment. In general, it may be desired to train the network with time domain data. Although the performance based on the frequency domain data was better in terms of running time and number of neurons according to Table 2 above, the cost to perform the FFTs may be significant and the process to perform the FFTs can be complicated. Further, the increase in running time resulting from an increase in the number neurons (e.g. from 2 to 12) is small. The sizeable increase in the number of neurons results in an insignificant increase in the runtime of the model to classify a target load.

In one embodiment, the trained model built using the TensorFlow machine learning framework uses a neural network having one hidden layer with three neurons and is trained on the data of the time-domain database. In this example design, the neural network can achieve over 99% accuracy in approximately 0.06 seconds.

For informational and contextual purposes, an example TensorFlow installation and execution guide used for examples described herein is provided. The system environment to run code was Python 3.5.2 and the TensorFlow version was 1.7.0. The PATH environment was properly modified and the "pip" Python package manager was installed. Instructions are as follows From the command line tool, change directory to the local copy of "\Software\Machine_Learning\TensorFlow". Type 'python train.py-h' to display the usage information, which is shown in the figure below. The command line usage is train.py [-h]--f F [-n N] [-w W] [-b B] [-r R] [-e E] [-s S].

For example, if the user wants to test the model with data file "Sa200_Lb17_V2_Tensor.mat", 2 layers, 40 neurons in each hidden layer, 0.1 learning rate for 100 epochs, the following command line should be used: python train.py --f "Sa200_Lb17_V2_Tensor.mat"-n 2 -w 40 -e 100 -r 1. After training and testing are done, the test result and time used will be shown. In one example, it took 69.56 seconds to train the network and 0.06 seconds to run. The accuracy was 73.77%.

The following sets forth example MATLAB code for data processing/augmentation:

```
%%% input the data from txt file to matlab
% enter the data txt file name here, data txt file should be in format of
% #_of_sample_points (rows)*
#_of_samples_per_bulb(columns)
file_name='test'; % update the txt file name
fname=[file_name,'.txt'];
fid=fopen(fname,'r');
% size is 400*10 for each bulb
num_sample_points=400; % need to be change
num_samples_per_bulb=10; % need to be change
size=[num_sample_points,num_samples_per_bulb];
raw_data=fscanf(fid,'% f',size)
%%% manually phase shift each sample
processed_data=[ ];
l=0;
for i=1:num_samples_per_bulb
processed_data=
[processed_data,raw_data(:,i)];
for j=
num_sample_points*1+2:num_sample_points*(1+1)
column=
processed_data(2:num_sample_points,j−1);
move_point=processed_data(1,j−1);
column=[column;move_point];
processed_data=[processed_data,column];
end
l=l+1;
end
%%% Create database of each bulb
% create corresponding mat file of processed data of each bulbs
save([file_name,'.mat'], 'processed_data');
```

The following sets forth example MATLAB code for building and training model in accordance with aspects described herein:

```
% starting num of layers
num=3;
% vector to save the num of layers
xx=[ ];
% vector to save the error rate
yy=[ ];
```

```
% vector to save the training time
ttrain=[ ];
% vector to save the running time
trun=[ ];
% try ten times with different num of layers
for i=1:10%
% x denotes the input vector
x=input;
y denotes the input vector
t=output;
% clear the net from previous iteration
clear net;
% Choose a Training Function
% 'trainlm' is usually fastest.
% 'trainbr' takes longer but may be better
for challenging problems.
% 'trainscg' uses less memory. Suitable in
low memory situations.
trainFcn='trainscg'; % Scaled conjugate
gradient backpropagation.
% create a new net
net=patternnet(num, trainFcn);
net.divideFcn='divideblock';
% Setup Division of Data for Training,
Validation, Testing
net.divideParam.trainRatio=85/100;
net.divideParam.valRatio=10/100;
net.divideParam.testRatio=5/100;
% Setup the stopping condition
net.trainParam.max_fail=20;
% Train the Network
% Start the timer
tic;
[net,tr]=train(net,x,t,'useGPU','yes');
tt=toc;
% Record the training time
ttrain=[ttrain tt];
% Test the Network
% Start the timer
tic
y=net(x);
tt=toc;
trun=[trun tt];
% Record the running time
e=gsubtract(t,y);
performance=perform(net,t,y)
tind=vec2ind(t);
yind=vec2ind(y);
% calculate error rate
percentErrors=sum(tind~=
yind)/numel(tind);
% adjust the num of layers
num=num+1;
% record num of layers
xx=[xx num];
% record num of error rate
yy=[yy percentErrors];
end
% Convert error rate to accuracy percentage
yy=(ones(1,10)-yy)*100;
% PLot performance
figure(1)
title('ML performance on 16 bulbs with FFT and SCG
training function')
yyaxis right
plot(xx,trun,'r-d','LineWidth',2,'MarkerSize',7)
xlabel('Num of layers')
ylabel('Running Time (s)')
yyaxis left
plot(xx,yy,'b-o','LineWidth',2,'MarkerSize',7)
ylabel('Accuracy (%)')
legend('Accuracy','Running
Time','Location','northwest')
box on;
grid on;
set(gca,'FontSize', 15);
figure(2)
title('ML performance on 16 bulbs with FFT and SCG
training function')
yyaxis right
plot(xx,ttrain,'rd','
LineWidth',2,'MarkerSize',7)
xlabel('Num of layers')
ylabel('Training Time (s)')
yyaxis left
plot(xx,yy,'b-o','LineWidth',2,'MarkerSize',7)
ylabel('Accuracy (%)')
legend('Accuracy','Training
Time','Location','northwest')
box on;
grid on;
set(gca,'FontSize', 15);
% View the Network
% view(net)
% Plots
% figure, plotperform(tr)
% figure, plottrainstate(tr)
% figure, ploterrhist(e)
% figure, plotconfusion(t,y)
% figure, plotroc(t,y)
```

The following sets forth example TensorFlow code for building and training a model in accordance with aspects described herein:

```
from_future_import print_function
import sys
import argparse
import tensorflow as tf
import scipy.io
import time
import numpy as np
parser=argparse.ArgumentParser( )
required=parser.add_argument_group('required   arguments')
required.add_argument('--f',
help='filename of training and testing matrix',
required=True)
parser.add_argument('-n','--n',
help='num of layers, default=3',
default=3)
parser.add_argument('-w', '--w',
help='num of neurons in each hidden layer, default=25',
default=25)
parser.add_argument('-b','--b',
help='batch size, default=1600',
default=1600)
parser.add_argument('-r','--r',
help='learning rate, default=0.01',
default=0.01)
parser.add_argument('-e','--e',
help='training epochs, default=20',
default=20)
parser.add_argument('-s','--s',
help='display step, default=1',
default=1)
```

```
results=parser.parse_args( )
filename=results.f
n_layers=int(results.n)
n_hidden=int(results.w)
batch_size=int(results.b)
learning_rate=float(results.r)
training_epochs=int(results.e)
display_step=int(results.s)
mat=scipy.io.loadmat(filename)
xtrain=mat['xtrain']
ytrain=mat['ytrain']
xtest=mat['xtest']
ytest=mat['ytest']
n_sample=xtrain.shape[0]
n_input=xtrain.shape[1]
n_class=ytrain.shape[1]
x=tf.placeholder('float', [None, n_input])
y=tf.placeholder('float', [None, n_class])
def multiplayer_perceptron(x, n_layers, n_input, n_hidden, n_class):
    layer=tf.add(tf.matmul(x, tf.Variable(tf.random_normal([n_input, n_hidden]))),
    tf.Variable(tf.random_normal([n_hidden])))
    layer=tf.nn.relu(layer)
    for i in range(1, n_layers):
        layer=tfadd(tf.matmul(layer, tf.Variable(tf.random_normal([n_hidden,
            n_hidden]))),
        tf.Variable(tf.random_normal([n_hidden])))
    layer=tf.nn.relu(layer)
    out_layer=tf.add(tf.matmul(layer, tf.Variable(tf.random_normal([n_hidden,
        n_class]))),
    tf.Variable(tf.random_normal([n_class])))
    return out_layer
# Set up model
pred=multiplayer_perceptron(x, n_layers, n_input, n_hidden, n_class)
# Define loss function
cost=tf.reduce_mean(tf.nn.softmax_cross_entropy_with_logits(logits=pred,
    labels=y))
# Define Optimizer
optimizer=tf.train.AdamOptimizer(learning_rate).minimize(cost)
# Initialize all varibles
init=tf.initialize_all_variables( )
correct_prediction=tf.equal(tf.argmax(pred, 1), tfargmax(y, 1))
accuracy=tf.reduce_mean(tf.cast(correct_prediction, 'float'))
# Train the model
with tf.Session( ) as sess:
    sess.run(init)
    start=time.clock( )
    for epoch in range(training_epochs):
        avg_cost=0
        total_batch=int(n_sample/batch_size)
        for i in range(total batch):
            _, c=sess.run([optimizer, cost], feed_dict={x: xtrain
                [i*batch_size: (i+1)*batch_size, :],
                y: ytrain[i*batch_size: (i+1)*batch size, :]})
            avg_cost+=c/total_batch
        if epoch % display_step==0:
            print('Epoch:', '%04d' % (epoch+1), 'cost=', '{:.9f}'.format(avg_cost))
    elapsed=(time.clock( )-start)
    print('Opitimization Finished!')
    # Test
    start=time.clock( )
    acc=accuracy.eval({x: xtest, y: ytest})
    elapsed2=(time.clock( )-start)
    print('Accuracy:', acc)
    print("Training time used:",elapsed)
    print("Running time used:",elapsed2)
```

Although example neural networks described herein are constructed using only one hidden layer, the number of hidden layers could be increased. An assessment of the accuracy, running time, and number of neurons in each layer under an increased number of hidden layer(s) would be helpful for assessing whether the increased complexity of the neural network provides significant enough advantages to warrant the increase in computational resources to achieve an acceptable runtime.

As detailed in various embodiments below, a model is built, trained, and applied to classify lighting loads. Only one 'sample' current waveform is needed as input to the model to classify the load, though additional samples could be fed into the model, if desired. If classification to a defined lighting load class is successful, then dimmer operating parameter(s) with which to configure the dimmer can be ascertained based on that lighting load class. The parameter(s) can be any parameters that configure the dimmer for desired lighting load dimming performance. They include but are not limited to a selection between forward and reverse dimming mode, firing and ending conduction angles for each half cycle, maximum conduction angle, various options for dimmer startup, and other parameters for operation. The dimmer or a remote entity can build, maintain and/or store a library or database that identifies optimal dimmer operating parameters and associated lighting load classes, correlating each class to a respective set of operating parameters to be used for that class. The specific parameters may vary depending on the particular dimmer model, since desired parameters for dimming a load with one dimmer may vary from those of another dimmer. The respective dimmer operating parameters associated with a class could be tailored to optimize performance of the drive circuitry of lighting loads of that lighting load class in order to meet a desired goal or specification, for instance to minimize flicker of the lighting load.

The desired dimmer operating parameters are configured on the dimmer after they are identified. In an example, the dimmer identifies and applies the parameters to itself. In other examples, a smartphone or other entity in communication with the dimmer issues programming instructions or other directives to the dimmer, which cause the dimmer to implement the parameters of its operation.

If a dimmer is unsuccessful at classifying a target lighting load using a machine learning model, insofar as a particular well-defined class of the model has not been identified with a high enough confidence, the electrical current data that the dimmer obtained for input to the model can be sent to a remote entity, for instance one that maintains a latest model that has been trained or retrained with the most current training data. That entity could classify the load using the updated model and provide a response to the dimmer. The response could be an indication of the proper class if the dimmer is properly configured to recognize that class and the associated operating parameters with which to configure itself. In another example, for instance one in which the class is relatively newly defined such that it does not exist in the version of the model that the dimmer possesses, the remote entity identifies and sends a set of operating parameter(s) to the dimmer for dimmer configuration.

Additionally or alternatively, the dimmer could receive an updated model and attempt the classification again.

In yet another example, the dimmer selects 'default' parameters when classification is unsuccessful, or the dimmer invokes a process to ascertain desired operating parameters by way of a different approach, for instance by prompting a user to identify the load type and/or parameters to use.

As an enhancement, flicker characteristics can be associated to the machine learning model classes based on identifying the correspondence between flicker and different characteristics of the lighting loads (wattage, driving circuit, type of LED lighting device) or dimmer type (ELV, MLV, Incandescent). Mapping current waveforms from different lighting loads to the bulbs' observed flicker properties (if present) identifies which waveforms result in flicker. In this manner, the model could be trained to maps current waveform to flicker properties. By using this in a dimmer, the dimmer could determine whether a particular dimming strategy is likely (as indicated by the model) to result in flicker by measuring the current waveform.

FIGS. 11-15 depict example processes for dimmer configuration, in accordance with aspects described herein. One or more aspects of these processes are performed by a dimmer. In this regard, the dimmer may include hardware for executing program code to perform actions, such as those described herein, including those as detailed with reference to FIGS. 11-15. Further details of example dimmers are provided elsewhere herein. Generally, a dimmer is for controlling conduction of a supply of power to a load, for instance a lighting load. The dimmer can include a line input terminal configured to be electrically coupled to the supply of power and a load output terminal configured to be electrically coupled to the lighting load. A switching circuit may be electrically coupled in series between the line input terminal and the load output terminal. The switching circuit may be configured to be selectively controlled between an ON state and an OFF state. Additionally, the dimmer can include a memory and a processor/processing circuit in communication with the memory. The memory can store program instructions for execution by the processor to perform aspects of processes described herein.

Figure 11:
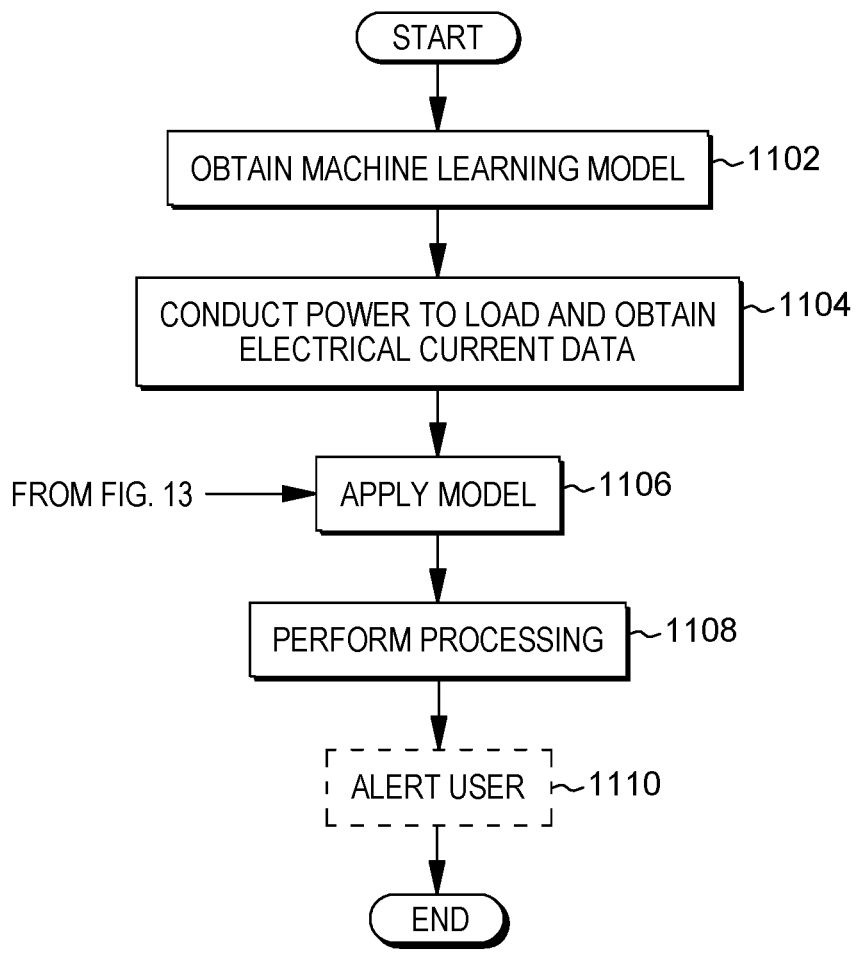
FIGS. 11-15 depict example processes for dimmer configuration, in accordance with aspects described herein.

Referring initially to FIG. 11, the process obtains (1102) a machine learning model, such a model as described herein. The model may be in the form of data file(s) or stricture(s) that are portable in that they can be stored/saved to memory and communicated between hardware devices. By obtaining is meant loaded, opened, acquired, received, or the like from component(s) of the dimmer or component(s) remote from the dimmer, for instance from a remote entity across one or more network(s). The machine learning model is configured for classifying lighting loads into a plurality of different lighting load classes based on properties of electrical current through the lighting loads. Example such properties are sampled current levels, as described herein.

The different lighting load classes can correspond to different lamp/bulb types having differing internal circuitry and electrical performance thereof. For instance, the different lighting load classes can include (i) a class for incandescent lamps, (ii) a class for compact fluorescent lamps, and (iii) more than one class for light emitting diode (LED) lamp types. Each such LED lamp type of the LED lamp types can differ from the other LED lamp types, for instance based at least on its drive circuitry. Each class of the more than one class can correspond to the drive circuitry of a respective LED lamp type of the LED lamp types.

The process of FIG. 11 continues by conducting (1104) the supply of power to the lighting load and obtaining electrical current data representing properties of electrical current through the lighting load over a duration of time. The lighting load refers to a target load to be classified, for instance a bulb that a user has recently installed. Obtaining the electrical current data can include sampling the current levels through that target bulb based on conducting the power to the load. The power conducted could be full power cycle(s) or less than full cycle(s).

The process applies (1106) the machine learning model using the obtained electrical current data representing the properties of electrical current through the lighting load. This is done in an attempt to classify the lighting load. In this regard, the applying may or may not successfully classify the load. There are different actions that the dimmer might take in different situations. Accordingly, the process proceeds by performing (1108) appropriate processing based on the result of that applying. In one example, performing processing includes configuring the dimmer with one or more dimmer operating parameters that control operation of the dimmer.

The process of FIG. 11 can optionally continue by triggering provision (1110) of an alert to a user indicating whether the applying classifies the lighting load into a lighting load class of the plurality of different lighting load classes. The alert may convey to the user whether classification was successful. In the case that it was successful and proper parameters were applied, the alert may more generally convey that the dimmer was successfully configured for proper or desired operation. In the case that the bulb was not classified and/or there was a problem with configuring the dimmer, the alert may indicate that. The alert could be delivered in audio, visual and/or haptic forms, as examples. For instance, the alert could be provided by way of illuminated lights in the dimmer, an audio tone played by the dimmer, and/or notifications or alerts to an associated software application installed on a user mobile device. It may be possible to 'pair' a dimmer to a user device to provide a communication and/or configuration channel between them and enable a user to interact with the dimmer.

Figure 12:
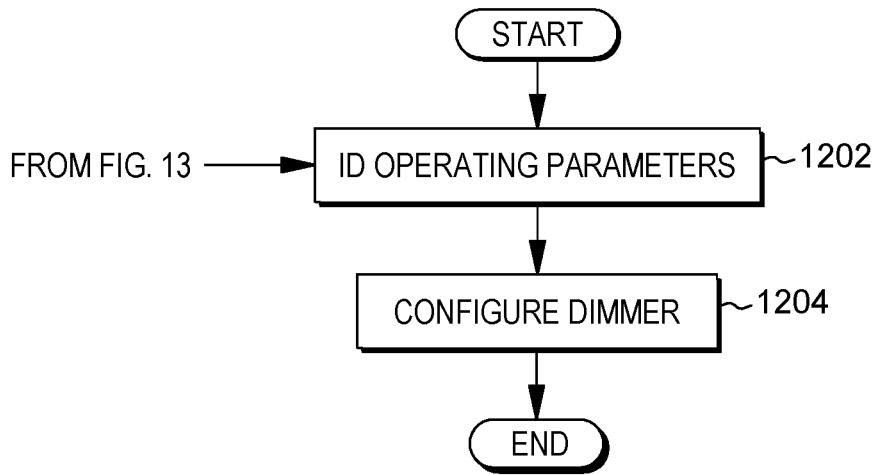

When the applying the model classifies the lighting load into a lighting load class of the plurality of different lighting load classes, then, referring to FIG. 12, the process can identify (1202), based on the lighting load class into which the lighting load was classified, the one or more dimmer operating parameters with which to configure the dimmer as one or more parameters that configure the dimmer for desired lighting load dimming performance by the dimmer. There are various options for the source of these parameters. As explained in further examples herein, the dimmer could hold a library/database that correlates, to each class, the optimal or desired dimmer operating parameters for that class. The library may be referenced to identify the specific parameter(s) with which to configure the dimmer for operation in dimming the target bulb just classified.

After identifying the parameters at 1202, the process can then configure (1204) the dimmer with the identified one or more dimmer operating parameters.

There may be situations where attempted classification by the dimmer using a model thereon is not successful. This may occur, as one example, when the respective confidence level that the bulb is classified into each class is below a given threshold. In one embodiment, the performing processing (1108) includes, referring to FIG. 13, sending (1302) the obtained electrical current data to a remote entity. The remote entity is a remote computer system, such as a cloud-based server or a user smartphone, as examples. The dimmer then receives (1304) a response from the entity. If the entity stores or has access to an updated model, then one response is provision of that updated model to the dimmer. The process of FIG. 13 continues by determining (1306) whether the response includes an updated model. This situation includes not only the scenario where the response data itself includes the model, but also the situation where the response informs the dimmer where to retrieve the updated model. If an updated model is returned (1306, Y), the process proceeds to 1106 of FIG. 11 where it applies the updated model and proceeds pursuant that process, i.e. by using the updated machine learning model and repeating the applying (1106) to classify the lighting load. Ideally, the repeating the applying classifies the lighting load into a lighting load class indicated by the updated model, and the dimmer can identify, based on the lighting load class indicated by the updated model, the one or more dimmer operating parameters and perform the configuring the dimmer with the identified one or more dimmer operating parameters (see FIG. 12).

Figure 13:
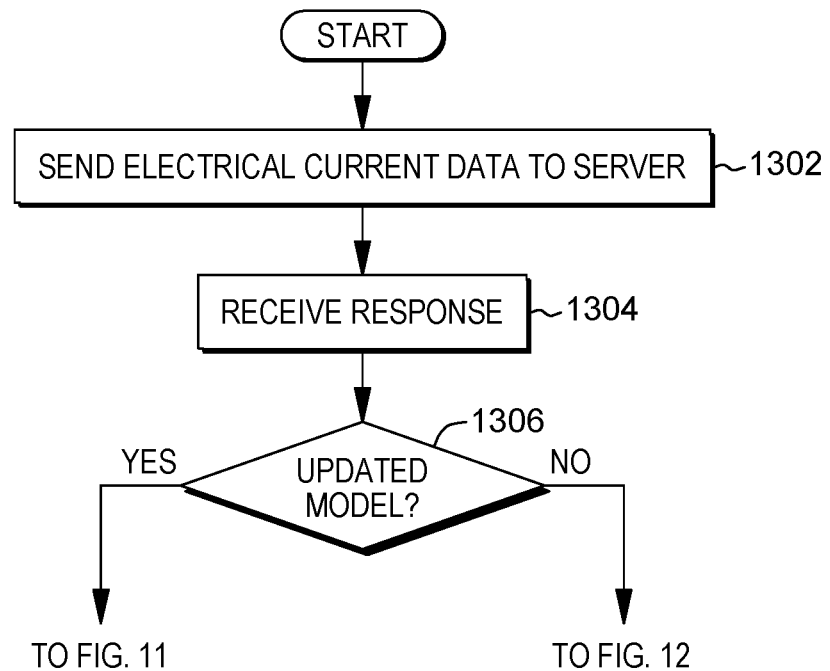

Referring back to FIG. 13, the remote entity might instead use the updated model to classify the load based on the data provided by the dimmer and respond with an indication of the proper class as ascertained by applying the updated model and/or an indication of parameter(s) that the dimmer is to use. In the example of FIG. 13, the response returned to the dimmer is not an updated model (1306, N) and is instead an indication of the class of the lighting load. The process proceeds to FIG. 12, where the dimmer identifies, based on the lighting load class indicated by the updated model and conveyed to the dimmer by the remote entity, the one or more dimmer operating parameters. In some examples, the parameters may have been received along with the indication of the class from the server. Alternatively, the dimmer may be configured to determine, based on the returned class, the proper parameters to use, for instance by referencing a library of parameters as explained above.

Figure 14:
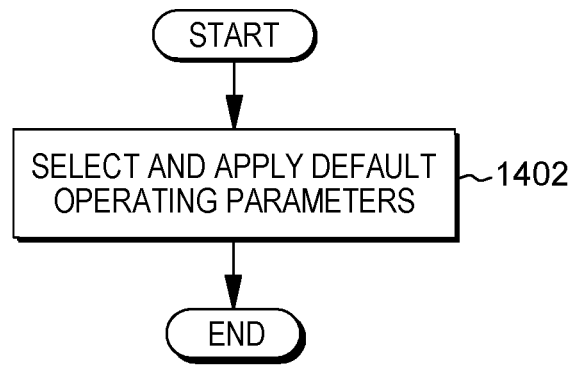

Some classification attempts may be unsuccessful even with the most updated model. The application of the model in these situations fails to classify the lighting load into any lighting load class of the different lighting load classes of the model. The process of FIG. 14 is invoked, in which the process selects and applies (1402) a default one or more dimmer operating parameters as the one or more dimmer operating parameters with which to configure the dimmer.

Figure 15:
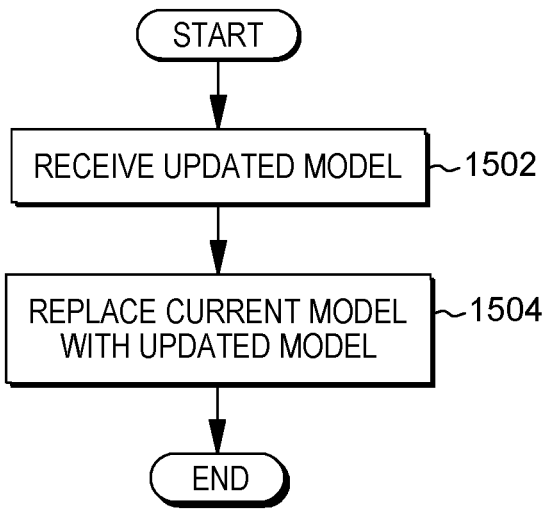

If the device applying the model is different from the device that builds the model, the device applying the model may occasionally receive an updated model. The model may be updated with respect to the classes included in the model, the level of training the model has been put through, and/or with respect to the construct of the neural network of the model, as examples. The 'updated' model may therefore may be a new version of the existing model or a completely new model altogether. In accordance with aspects described above with reference to FIG. 11, a machine learning model is maintained on the dimmer for lighting load classification. FIG. 15 depicts an example of updating that model. The process includes periodically or aperiodically receiving (1502), e.g. from a remote entity, an updated machine learning model. This may be retrieved responsive to the dimmer requesting or checking for an updated model, or the server pushing the model to the dimmer absent an explicit request. In some examples, the updated model is delivered as part of a firmware update to the dimmer issued to it by a remote server or by a software application (e.g. mobile application) of a dimmer user's device. The process continues by replacing (1504) the maintained machine learning model with the received updated machine learning model such that the updated machine learning model becomes the maintained machine learning model for lighting load classification. To facilitate model delivery, the dimmer can include a network interface through which the model is received, for instance a wireless network interface connected to a consumer's wireless network through which the dimmer is connected to a network. Alternatively, the network connection of the dimmer may be via a powerline network communicating with a consumer's network. The model can be obtained through the network interface from a remote entity connected to the network.

Figure 21:
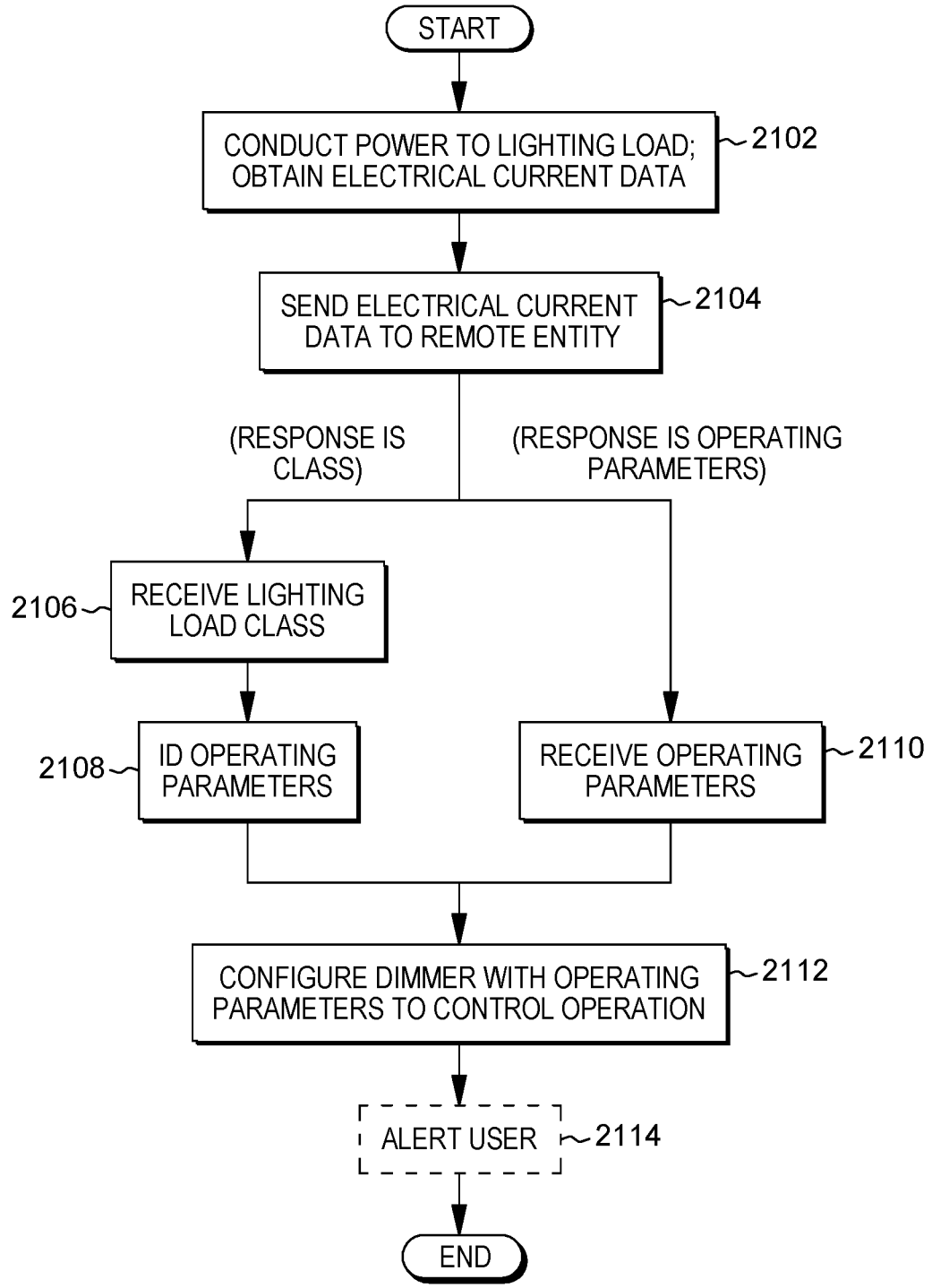
FIG. 21 depicts another example process for dimmer configuration, in accordance with aspects described herein.

FIG. 21 depicts another example process for dimmer configuration, in accordance with aspects described herein. The process follows actions performed by a dimmer when the model is stored and applied on a remote entity, for instance a remote server or a consumer's personal computer system that has the model. As above, the dimmer may be for controlling conduction of a supply of power to a lighting load, and include a line input terminal, load output terminal, memory, and a processor in communication with the memory. The dimmer may be configured to perform the process of FIG. 21.

The process begins with the dimmer conducting the supply of power to the lighting load and obtaining (2102) electrical current data representing properties of electrical current through the lighting load over a duration of time. This obtains the sample(s) on which the classification of the load will be based. The dimmer sends (2104) the electrical current data to a remote entity. The remote entity is configured to provide a response, for instance a response indicating a class into which the load is classified based on application of the model, or a response indicating operating parameters for the dimmer. Accordingly, based on the response being an indication of the class itself, the process proceeds by receiving (2106) from the remote entity an indication of a lighting load class into which the lighting load is classified, and then identifying (2108), based on that indication, the one or more dimmer operating parameters with which to configure the dimmer to control its operation. As described above with reference to FIG. 12, the dimmer could identify the parameters to use based on a stored library of parameters to use for different load classes. The library could be dimmer type or model specific. The dimmer could maintain its own database of dimmer operating parameters and associated lighting load classes, each lighting load class of the associated lighting load classes being associated with a respective one or more dimmer operating parameters on a basis that the respective one or more dimmer operating parameters optimizes performance of drive circuitry of lighting loads of that lighting load class to minimize flicker on the lighting load.

After identifying the operating parameters (2108), or if instead the response from the remote entity to 2104 is an indication of the one or more dimmer operating parameters, the process proceeds by configuring (2112) the dimmer with the identified operating parameters to control operation of the dimmer.

By the above, based on a classification of the lighting load, the classification being based on the sent electrical current data, the process configures the dimmer with the one or more dimmer operating parameters that control operation of the dimmer. The classification of the lighting load includes a classification into a lighting load class of a plurality of different lighting load classes that correspond to different lamp types having differing internal circuitry and electrical performance thereof. The different lighting load classes could include, as examples: (i) a class for incandescent lamps, (ii) a class for compact fluorescent lamps, and (iii) more than one class for light emitting diode (LED) lamp types. Each LED lamp type of the LED lamp types could differ from the other LED lamp types based at least on its drive circuitry, and each class of the more than one class could correspond to the drive circuitry of a respective LED lamp type of the LED lamp types. The process of FIG. 21 concludes by optionally triggering provision (2114) of an alert to a user indicating whether the lighting load is successfully classified into a lighting load class.

FIGS. 16-20 depict example processes of a remote entity to facilitate dimmer configuration, in accordance with aspects described herein. The processes may reflect what occurs on the remote entity as one or more aspects described above are performed on the dimmer. The remote entity could be any computer system or other device configured for processing. Examples include, but are not limited to, a server on a wide area network, such as the internet, that the dimmer connects to, or a user device such as a personal computer or mobile device.

Figure 16:
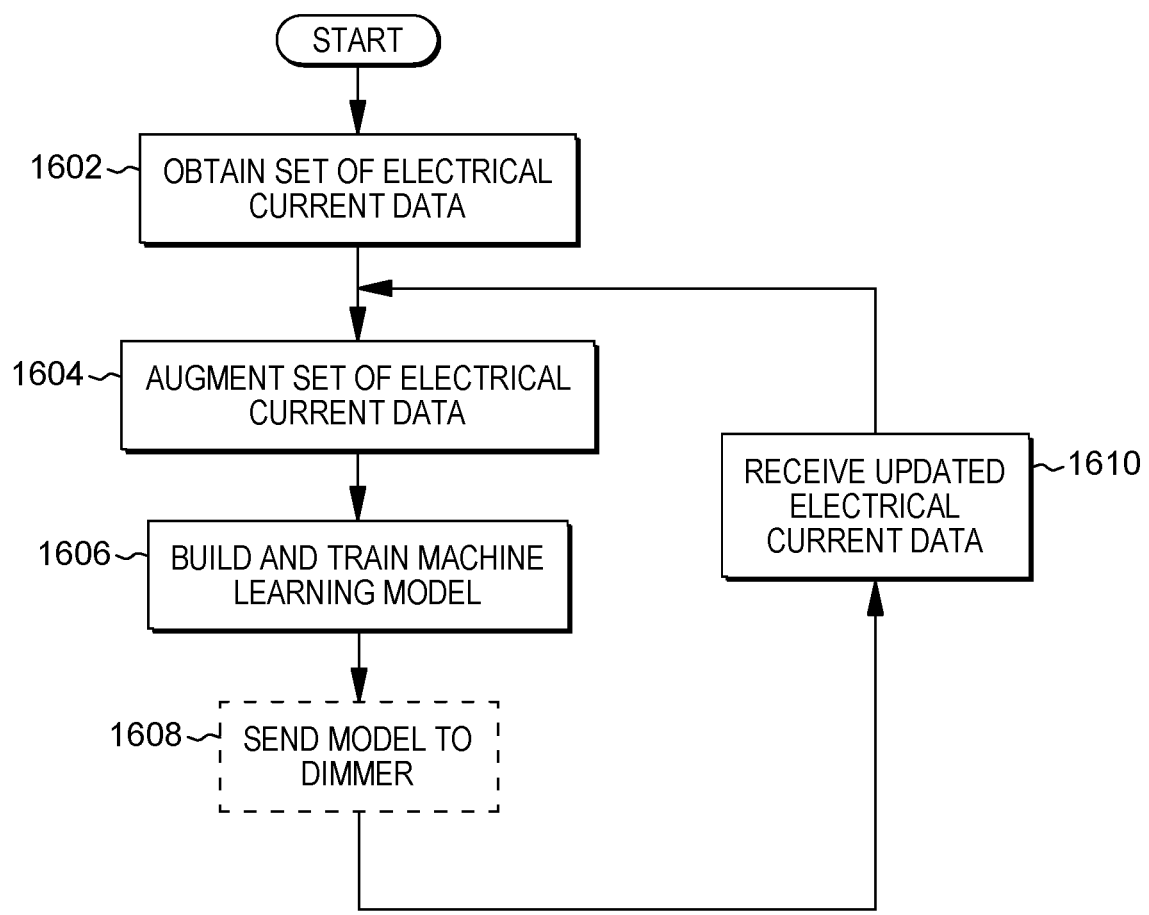
FIGS. 16-20 depict example processes of a remote entity to facilitate dimmer configuration, in accordance with aspects described herein.

Referring initially to FIG. 16, which details aspects of model building, the process obtains (1602) a set of electrical current data representing properties of electrical current through each lighting load of a collection of different lighting loads. The obtained set of electrical current data includes, as an example, an initial dataset of sampled current level values along a current waveform having a phase, the sampled current level values being sampled at corresponding angles of the phase. The method further includes augmenting (1604) the obtained set of electrical current data. An example process for such augmentation is described and depicted with reference to FIG. 17 below.

The process of FIG. 16 continues by building the machine learning model using a machine learning algorithm and the obtained set of electrical current data. The building includes training the machine learning model using the obtained set of electrical current data and, in many cases, the augmented data. The machine learning model is configured for classifying lighting loads into a plurality of different lighting load classes based on properties of electrical current through the lighting loads. The different lighting load classes correspond to different lamp types having differing internal circuitry and electrical performance thereof. The different lighting load classes include, for instance: (i) a class for incandescent lamps, (ii) a class for compact fluorescent lamps, and (iii) more than one class for light emitting diode (LED) lamp types. Each such LED lamp type of the LED lamp types differs from the other LED lamp types based at least on its drive circuitry. Each class of the more than one class of LEDs corresponds to the drive circuitry of a respective LED lamp type of the LED lamp types. FIG. 16 proceeds by optionally, e.g. when the dimmer performs the classifying, sending (1608) the machine learning model to the dimmer for lighting load classification to be performed by the dimmer.

Regardless of whether the model is being sent to the dimmer, the method further includes receiving (1610) electrical current data representing properties of electrical current through other lighting loads. 'Other' loads here refers to other bulbs not represented in the existing training set. The electrical current data of those other bulbs could be obtained in the laboratory setting or could be obtained from existing dimmers installed in the field, for instance ones that have reached out for bulb classification after applying the old model which was unable to classify the bulb. Based on receiving the updated electrical current data, the method returns to 1604 to augment the dataset and retrain the machine learning model based on the received electrical current data. The retraining provides an updated machine learning model for subsequent classification of additional lighting loads.

Figure 17:
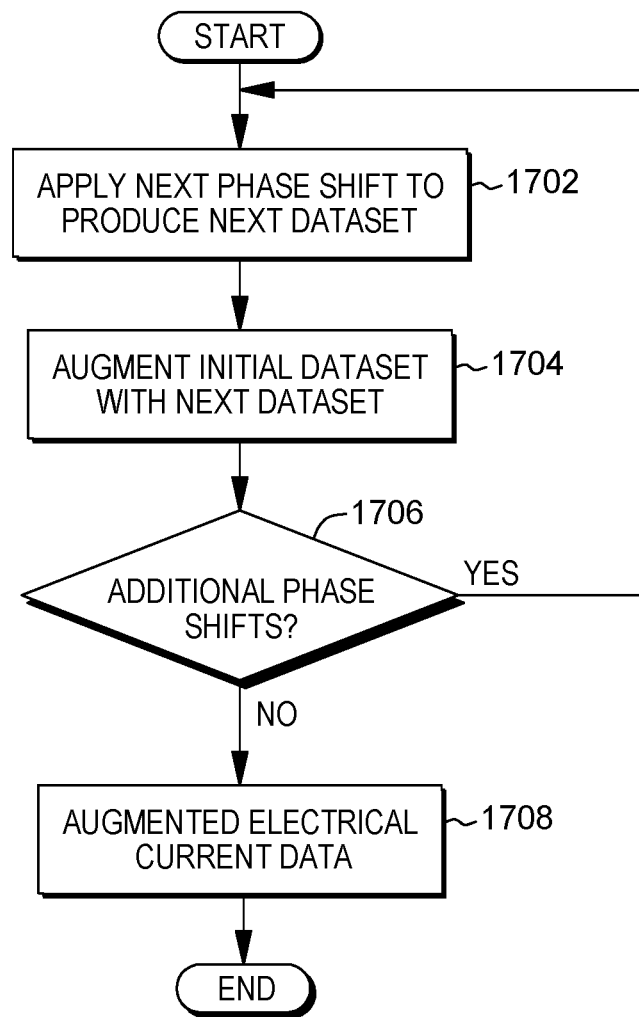

FIG. 17 depicts an example process for augmenting an initial obtained set of electrical current data. The process applies (1702) a next phase shift to the sampled current level values of the initial dataset to produce another dataset. The another dataset has current level values at corresponding shifted angles of the phase. The process augments (1704) the initial dataset with that next dataset. The process iterates at that point as long as there are additional phase shifts to perform. This is determined at 1706, where the process returns to 1702 if there are additional phase shifts (1706, Y). Otherwise (1706, N) the iterating is complete. Provided as a result of the augmentation is augmented electrical current data (1708), and the training or retraining trains the machine learning model using this augmented electrical current data.

Figure 18:
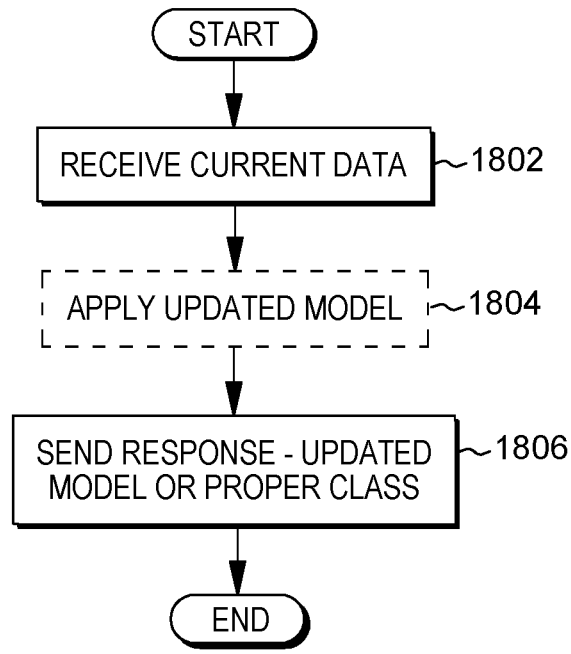

FIG. 18 depicts an example process in which a dimmer applying a model is unable to classify the target load and notifies a remote entity that preforms the process of FIG. 18. The process receives (1802), from the dimmer, electrical current data representing properties of electrical current through a target lighting load for classification. The process optionally applies (1804) an updated machine learning model to the received electrical current data representing properties of electrical current through the target lighting load, to classify the target lighting load into a lighting load class. At that point the process sends (1806) a response to the dimmer. The response includes an indication of the lighting load class and/or one or more dimmer operating parameters that are to control operation of the dimmer. The one or more dimmer operating parameters may be identified based on the lighting load class into which the target lighting load is classified.

Figure 19:
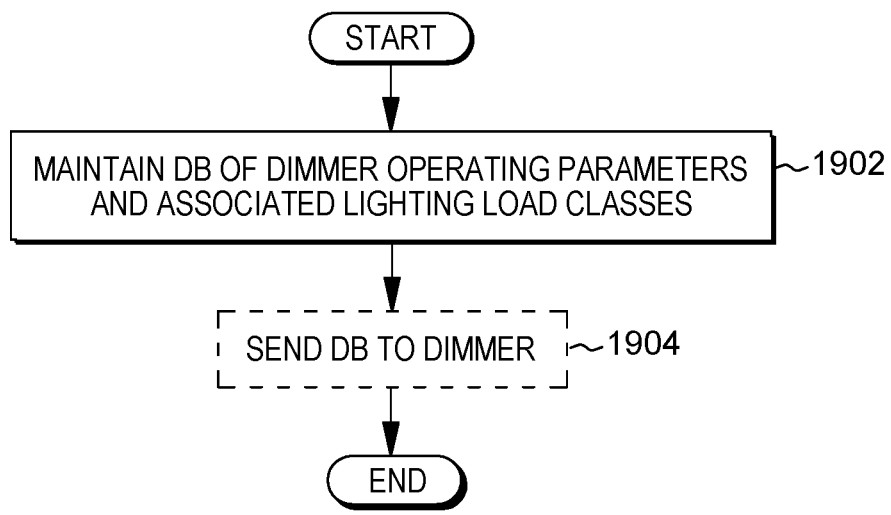

In some embodiments, a database of dimmer operating parameters and associated lighting load classes is maintained and optionally sent to dimmer(s) to ascertain desired parameters to achieve optimal dimming. FIG. 19 depicts an example process in which a remote entity holds this database of correlations between optimal parameters and the classes. The process maintains (1902), for instances stores and refines over time as additional data is received, the database of dimmer operating parameters and associated lighting load classes. Each lighting load class of the associated lighting load classes is associated with a respective one or more dimmer operating parameters on a basis that the respective one or more dimmer operating parameters optimizes performance of drive circuitry of lighting loads of that lighting load class to minimize flicker on the lighting load. In scenarios where the database is to be shared to other devices, such as a dimmer, the process proceeds by sending (1904) the database to the dimmer.

Figure 20:
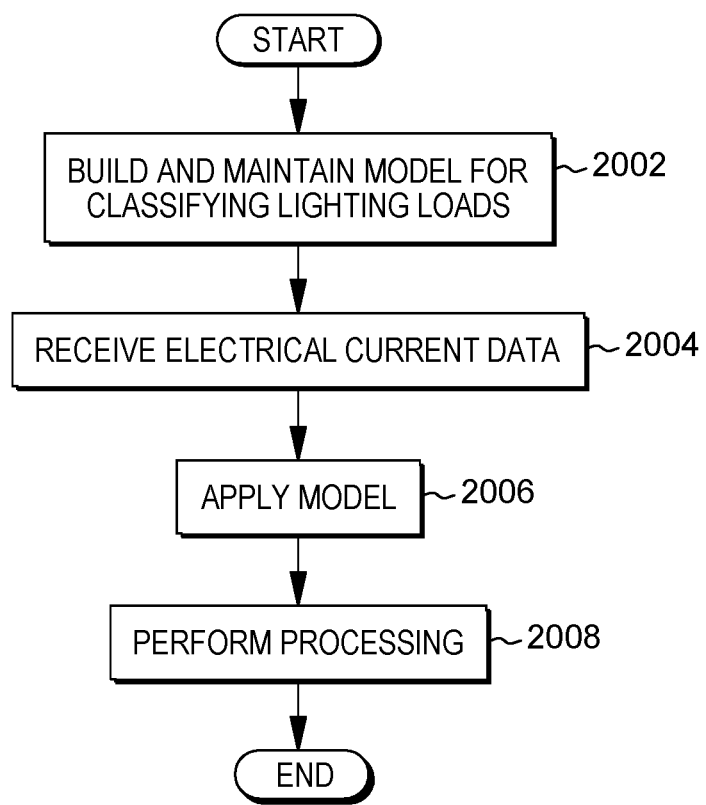

FIG. 20 depicts an example process in which a remote entity processes received data to classify a target load. Initially, the entity builds/maintains (2002) a machine learning model configured for classifying lighting loads into a plurality of different lighting load classes based on properties of electrical current through the lighting loads. The process obtains/receives (2004), from a dimmer, electrical current data representing properties of electrical current through a lighting load over a duration of time. The dimmer may or may not have attempted to classify based on data. The process applies (2006) the machine learning model, using the obtained electrical current data representing properties of electrical current through the lighting load, to classify the lighting load, and then performs (2008) appropriate processing.

In some examples, the applying classifies the lighting load into a lighting load class of the plurality of different lighting load classes. The processing (2008) in that example can include (i) sending to the dimmer an indication of the lighting load class, e.g. sending the class label which may enable the dimmer to decide how to handle that class, and/or (ii) sending to the dimmer one or more dimmer operating parameters that control operation of the dimmer, the one or more dimmer operating parameters being identified based on the lighting load class into which the lighting load is classified.

In other situations the applying fails to classify the lighting load into any lighting load class of the plurality of different lighting load classes. The processing (2008) in that case includes sending to the dimmer an indication of a default. The default may not be included in the plurality of different lighting load classes. The default can be associated with a default one or more dimmer operating parameters that control operation of the dimmer.

Additionally or alternatively, when the applying fails to classify the lighting load into any lighting load class of the plurality of lighting load classes, the processing (2008) can include indicating to the dimmer that the class of the lighting load is unknown. In these situations, the dimmer can figure out what to do with that information. It may, for instance, gather more information about the load by asking an operating user for an indication of the bulb type, it may perform other testing to tailor some operating parameters, and/or it may use the class with the highest confidence score, as examples.

Aspects described herein may be performed by various devices. Example such devices include dimmers/dimming systems, a particular example of which may include a two-wire dimmer used for controlling electrical power to a load. Example dimmers include lighting loads dimmers and fan speed controls, as examples. Example loads with which aspects presented herein may work include, but are not limited to, lighting loads, such as incandescent, LED, CFL, and MLV lighting loads, as examples.

By way of background, many countries have an electric grid infrastructure that uses alternating current as a power source (referred to herein as an "AC source"). These systems typically include a phase line and a neutral line. The neutral line is sometimes referred to as a return path for the AC source supplied by a phase line. A line is an electrically conductive path that can also be referred to as a "wire". The terms "line", "conductive line", "conductive path,", "conductor," and "wire" are considered herein to be synonymous. Also present is a ground line which provides a low impedance path back to the AC source should a fault occur (e.g. a phase line coming into contact with a metal box). The neutral wire is typically grounded (e.g. electrically bonded with the ground line) at the main electrical panel.

A two-wire dimmer provides the ability to omit a direct connection to the neutral line, enabling the dimmer to be quickly and easily installed as a replacement for a mechanical switch in the event that a neutral connection is not available. This avoids potentially having to rewire the existing installation, which can be expensive and time consuming.

Two-wire dimmers typically control the power provided to the load by utilizing a solid state switching device to employ phase control, i.e., "chop" the AC waveform (also referred to herein as the "AC wave"). The solid state switching device may include, e.g., one or more Thyristors, Triodes for Alternating Current (TRIACs), Silicon-controlled Rectifiers (SCRs), Metal-Oxide-Semiconductor Field-Effect Transistors (MOSFETs), Insulated-Gate Bipolar Transistors (IGBTs) or other solid state switching devices to perform phase control. During operation, the switching device provides power to the load during a portion of every half-cycle of an AC power source. The ratio between the portions of the half-cycle when power is provided to the load and not provided to the load is dependent on the intensity setting (e.g. firing angle) of the dimmer. In some two-wire dimmers, the dimmer's internal power supply is energized by using a portion of the half-cycle when the solid state switching device is not conducting and enables the provision of power to the dimmer's various components.

Challenges exist in using two-wire dimming systems incorporating a two-wire dimmer. First, since the load affects how much power can be provided to the dimmer, two-wire dimmers may not have their minimum power load requirement met in order to function properly when used with certain low power loads. If the load power rating (or maximum power dissipation) is less than the minimum power load requirement (for instance 25-40 W in some example loads), the dimmer receives inadequate power to operate, causing the dimmer to stop working. Another challenge with two-wire dimmers is that if the load becomes inoperative, e.g., burned-out, the two-wire dimmer cannot power itself (e.g., the conductive path of the load to neutral becomes an open circuit), creating the impression of a broken two-wire dimmer.

Figure 22:
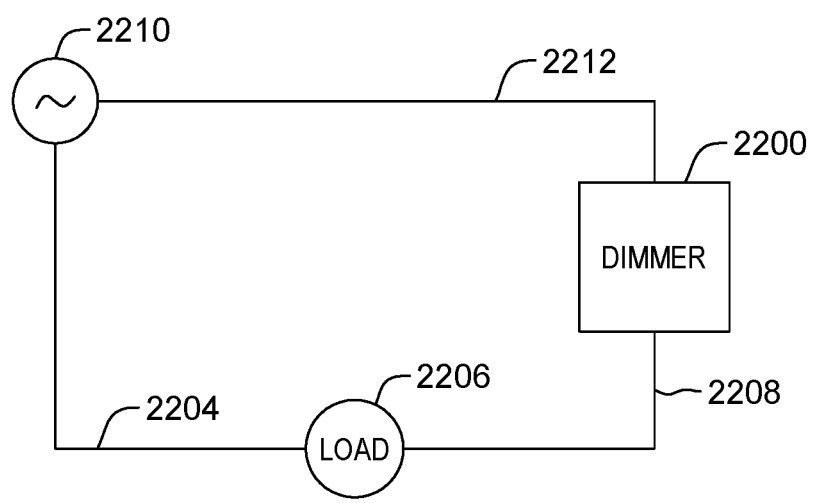
FIG. 22 depicts an example of a dimming system including a two-wire dimmer.

FIG. 22 shows a dimming system having a two-wire dimmer 2200. Current travels from AC source 2210 via phase line 2212 through dimmer 2200 and through load 2206 via load wire or line 2208 to AC source 2210 via neutral wire or line 2204.

The dimmer 2200 includes a circuit to control the power delivered to the load 2206 by "chopping" the current coming from AC source 2210. A controller may operate a power switch to regulate the power delivered to the load using a phase control technique. The AC source has a sinusoidal waveform that oscillates through cycles. More specifically, each sinusoidal cycle is referred to as a full cycle. Each full cycle includes a positive half-cycle and a negative half-cycle that complete a single full cycle or phase of the AC power. The positive half-cycle begins at a first zero-crossing of the phase and ends at a midpoint zero-crossing at the midpoint of the phase. The negative half-cycle begins at the midpoint zero-crossing and ends at another zero-crossing at the end of the single phase. For common 60 Hz power, an entire AC cycle (a single cycle/phase) occurs in $\frac{1}{60}$th of a second.

When employing forward phase dimming and a latching power switch (e.g., a TRIAC), at the beginning of the AC cycle, the power switch remains off during a delay period until the desired firing angle is reached. The TRIAC is turned on at a firing angle by applying one or more pulses to the gate of the TRIAC to connect the AC source to the load. Alternately, a constant/long duration pulse can be supplied to the gate of the TRIAC to hold the TRIAC in a conducting state regardless of the amount of current being conducted through the load (as opposed to discrete pulses). The portion of the AC voltage waveform actually applied to the load is that portion extending from the firing time to the end of, or near the end of, the half-cycle. The portion of the AC voltage waveform applied during that portion of the AC cycle is referred to as the conduction period of the positive half-cycle. The TRIAC continues conducting power to the load during this time until it switches off at (or near) the midpoint zero-crossing. TRIACs are self-commutating devices, meaning that they turn themselves off when the current through the device falls below a holding level after the control signal has been removed. The same process is repeated for the negative half-cycle, in which the TRIAC turns on after a delay period, and turns off at (or near) the next zero-crossing. Generally, if the load is purely resistive, the current flowing through the load has essentially the same waveform as the portion of the AC voltage applied to the load, with no phase shift between the current and the voltage. Additionally, the firing delay periods are generally equal in duration, though they could be different.

Varying the conduction period varies the percentage of available power delivered to the load, thereby regulating the total amount of power delivered to the load. If the load is a lighting load, regulating the amount of power controls the brightness of the load.

It is understood that while other types of power switches, like MOSFETs and IGBTs, are similarly used to control conduction and firing angles, the controlling of these switches may be different from the manner described above, which is provided by way of example only.

Some power switches, such as transistors and relays, receive a constant gate signal during the entire conduction period. Other power switches, such as TRIACs and SCRs, have regenerative switching properties that cause them to latch in the conductive state in response to short gate pulse(s) if the load current exceeds a latching level. Once in the conductive state, if the control signal is removed the power switch remains conductive until the current through the switch drops below a holding level, at which point the power switch automatically switches off. This typically occurs when the load current drops below the holding level at or near a zero-crossing.

By way of specific example, a gate pulse may be used for a transistor or other power switch requiring a continuous gate pulse during the entire conduction period. Thus, the gating operation consumes power during the entire conduction period. This technique can be, and in some instances is, used to maintain a latching power switch such as a TRIAC or SCR in a conducting state when there may otherwise not be enough current to do so.

In examples where only a short gate pulse is used to trigger a TRIAC or SCR and latch for substantially the remainder of the half-cycle, the gating operation consumes power only during a small fraction (duration of the short gate pulse) of the conduction period, thereby reducing the overall power consumption.

A short gate pulse gating technique may work adequately with a purely resistive load, however a different set of challenges is presented when used with loads having an inductive or other nonlinear characteristics. Noise can appear on the current through the load leading to a misfiring. For example, the current drawn by a MLV load, typically does not follow the waveform of the AC source (e.g. input voltage) to the dimmer. Instead, since the current is delayed with respect to the AC voltage, a misfiring event would lead to an asymmetry in the current waveform which leads to the transformer of the MLV load saturating and resulting in a large inrush of current. This is in contrast to a resistive load in which the current corresponds directly with the voltage waveform. If a short gate pulse is applied to the TRIAC during the time period between the start of the cycle and the time at which current draw begins, the MLV load may fail to turn on and/or remain on. That is, since the gate pulse is applied at a time when the MLV load draws no current, the switching device, e.g., the TRIAC, may not turn on at all, and the entire half-cycle of conduction may be missed. Alternatively, if the gate pulse is applied at a time when the load may draw some current, but not enough to latch the TRIAC in the conductive state, the load may receive power only during the duration of the gate pulse, and the result may be a short flash of light from the load, i.e., flickering. Thus, the firing angle corresponding to the time at which current draw begins could represent the limit for maximum brightness, i.e., the maximum possible conduction time.

Likewise, there is typically a firing angle corresponding to a minimum brightness close to the end of the half-cycle. If the TRIAC is gated too late, it may fail to conduct any power to the MLV load or it may only conduct during the gate pulse period if the MLV load does not draw enough current to latch the TRIAC or hold the TRIAC in the conductive state for the appropriate length of time. The result may be a flicker of light, or the lamp may turn off abruptly rather than dimming smoothly as the lower end to the dimming range is approached. Problems at the lower end of the range may be compounded by the decreasing line voltage that is available, as well as the short duration of the conduction period through the TRIAC. The above problems may also be seen with other types of loads (other than MLV) as well.

The firing angles for minimum and maximum brightness for any given load, however, may not be known in advance. Moreover, the firing angle limits may change due to variations in operating conditions such as lamp wattage, number of lamps on the circuit, line voltage, temperature, etc., as well as variations between lamps from different manufacturers, manufacturing tolerances, etc.

One way to assure that the TRIAC will be triggered when operating near the point of maximum brightness is to continue gating the TRIAC during the entire conduction period. Then, even if the gate pulse begins before the time at which current draw begins, the continuous gating assures that the TRIAC will eventually begin conducting when the MLV load begins drawing current at the time at which current draw begins. This may, however, consume more power than the power supply can provide.

Another technique for overcoming uncertainty in the precise timing to trigger switch firing near the points of minimum and maximum brightness involves the use of multiple gate pulses. Using enough pulses over an appropriate length of time may assure that one of the pulses will trigger the TRIAC at a time when the load will draw enough current to latch. Because two-wire dimmers are limited in the amount of power they can draw through the load, use of latching power switches that can be triggered by short pulses may be adopted because it reduces the amount of power required by a controller.

The above example situations highlight just some considerations that may be appropriate to take into account when determining desired parameters for proper dimmer operation. Hence, classification approaches and parameter selection as described herein can advantageously provide a way of quickly determining and applying the appropriate parameters for the given load type being used with a given dimmer. The parameters indicated as being appropriate for each different load type may be selected such that they avoid malfunctions, flickering, and/or other undesired operation.

Figure 23:
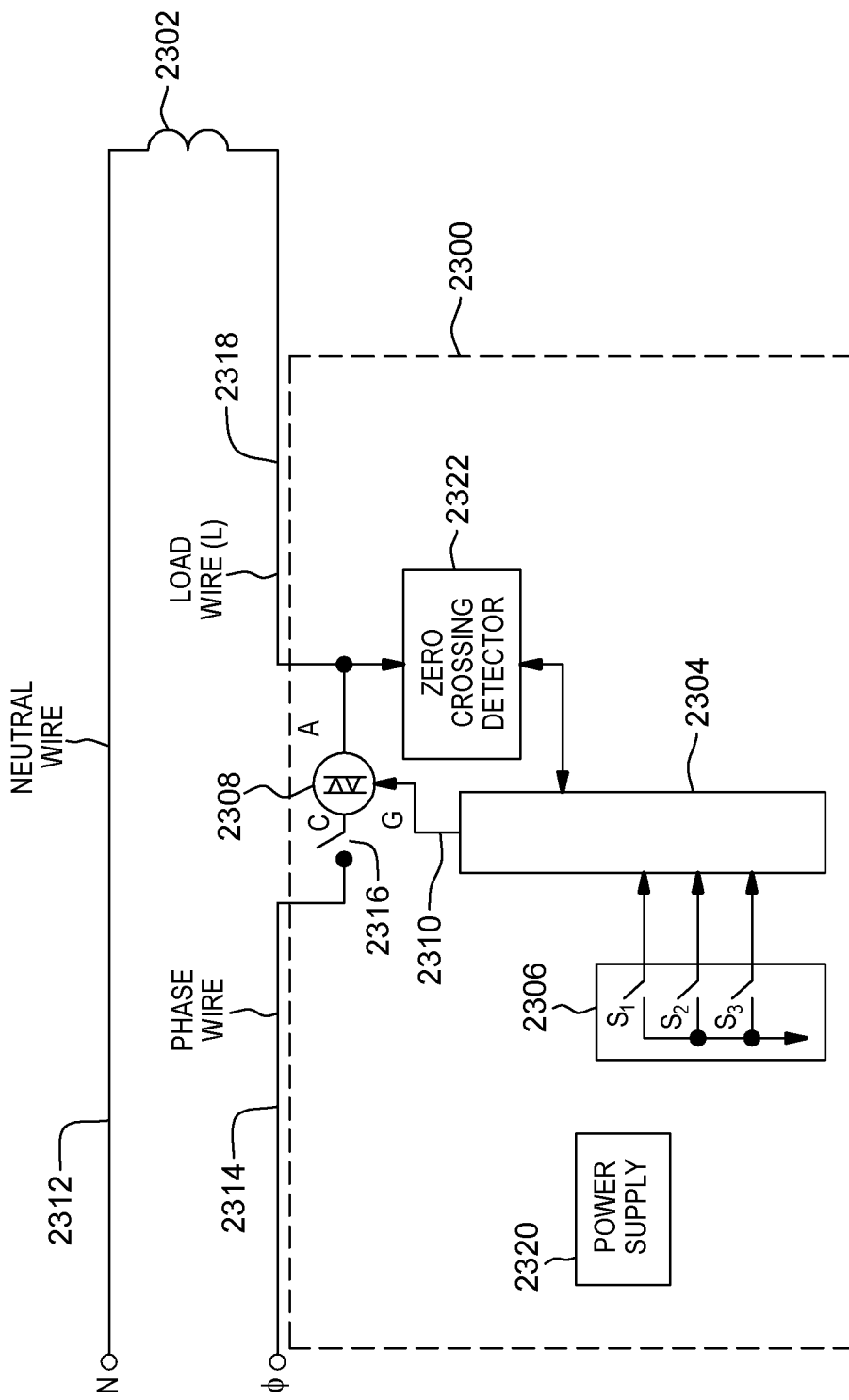
FIG. 23 depicts further details of an example two-wire dimmer.

Further details of an example two-wire dimmer are depicted and described with reference to FIG. 23. In FIG. 23, dimmer 2300 receives power from the AC source via phase wire 2314 and delivers power to load 2302 via load wire 2318.

The dimmer includes digital control electronics and code for execution to perform various aspects, including some described herein. The digital control electronics and/or code can be implemented via processor(s), microprocessor(s), controller(s), and/or microcontroller(s) (sometimes referred to collectively as "controller", "processor", "computer processor", or "processing circuit"). In the embodiment of FIG. 23, controller 2304 is coupled to one or more user-accessible actuators 2306. A user of dimmer 2300 is able to engage actuator(s) 2306 and the controller 2304 may interpret this as a command or a set of commands to perform one or more actions for delivering power to the load 2302. In response to the received command information, dimmer 2300 can control delivery of power to the load 2302.

Dimmer 2300 can control, for example, the amount of current flowing through load 2302 by proper activation of TRIAC 2308, as described above. TRIAC 2308 is a bidirectional three terminal semiconductor device that allows bidirectional current flow when an electrical signal of proper amplitude is applied to its "G" (or gate) terminal via control line 2310. TRIAC 2308 also has a "C" (or cathode terminal) and an "A" or anode terminal. When an electrical signal is applied to the gate G, TRIAC 2308 is said to be gated. When properly gated, current (or other electrical signal) can flow from the "C" terminal to the "A" terminal or from the "A" terminal to the "C" terminal. When TRIAC is not gated or is not properly gated, relatively very little or substantially no current (or no signal) can flow between the "A" and "C" terminals. TRIAC 2308 thus acts as an electrically controlled power switch that can allow some or no current flow based on the amplitude of the electrical signal applied to its "G" terminal. Alternatively, the switching component of FIG. 23 (TRIAC 2308) could in some examples be implemented as two TRIACs TR1 and TR2, where TRIAC TR1 is controlled by controller 2304, which applies a fire signal onto control line 2310 to turn on TRIAC TR2, which in turn gates TRIAC TR1 allowing an AC signal to pass through load 2302 and back to the AC source via neutral wire 2312.

Connected in series to TRIAC 2308 is mechanical switch 2316. Mechanical switch 2316 can be an "air gap switch" that can be activated to stop current flow through the dimmer 2300, thus stopping current flow through the load wire 2318, load 2302 and neutral wire 2312 (mechanical switch 2316 disconnects power to the dimmer 2300 as a whole and load 2302 to permit servicing and/or replacement of a light bulb, etc.). TRIAC 2308 can be gated to provide current amounts related to intensities of load 2302 (for example intensity of the light if load 2302 includes a lighting element, fan speed if light 2302 includes a fan, etc.) or can be gated to provide substantially no current thus essentially switching off load 2302.

Power supply 2320 is provided to power operation of component(s) of dimmer 2300. Power supply may receive power from the phase line 2314, in one example. The power supply 2320 may power, for instance, operation of controller 2304. The controller 2304 can be coupled to and communicate with a zero-crossing detector circuit 2322. The zero-crossing detector circuit 2322 outputs a ZC signal. The controller 2304 can use the ZC signal for various timing functions, such as the proper timing of pulses/signals that the controller 2304 generates to control TRIAC 2308.

An example dimmer to incorporate and/or use aspects described herein and control conduction of a supply of power to a lighting load can therefore include a line input terminal and a load output terminal, with the line input terminal configured to be electrically coupled to the supply of power, and the load output terminal configured to be electrically coupled to the lighting load as described above. The dimmer can also include a switching circuit that is electrically coupled in series between the line input terminal and the load output terminal, and is configured to be selectively controlled between an ON state and an OFF state. Additionally, the dimmer can include a controller having some form of memory/storage and processing circuit, where the memory is to store instructions for execution by the processing circuit to perform actions described herein. In this regard, the dimmer may be regarded as a computer system capable of executing program instructions.

In other embodiments, a computer system to perform aspects described herein may take on a more typical form, such as that of a hosted server system or a user mobile device. Thus, processes as described herein may be performed by one or more computer systems, such as those described herein, which may include one or more dimmers/dimming systems and/or one or more computer systems of or connected thereto, such as one or more cloud servers, one or more user personal computers such as a smartphone, tablet, or other device, and/or one or more other computer systems.

Although various examples are provided, variations are possible without departing from a spirit of the claimed aspects.

Figure 24:
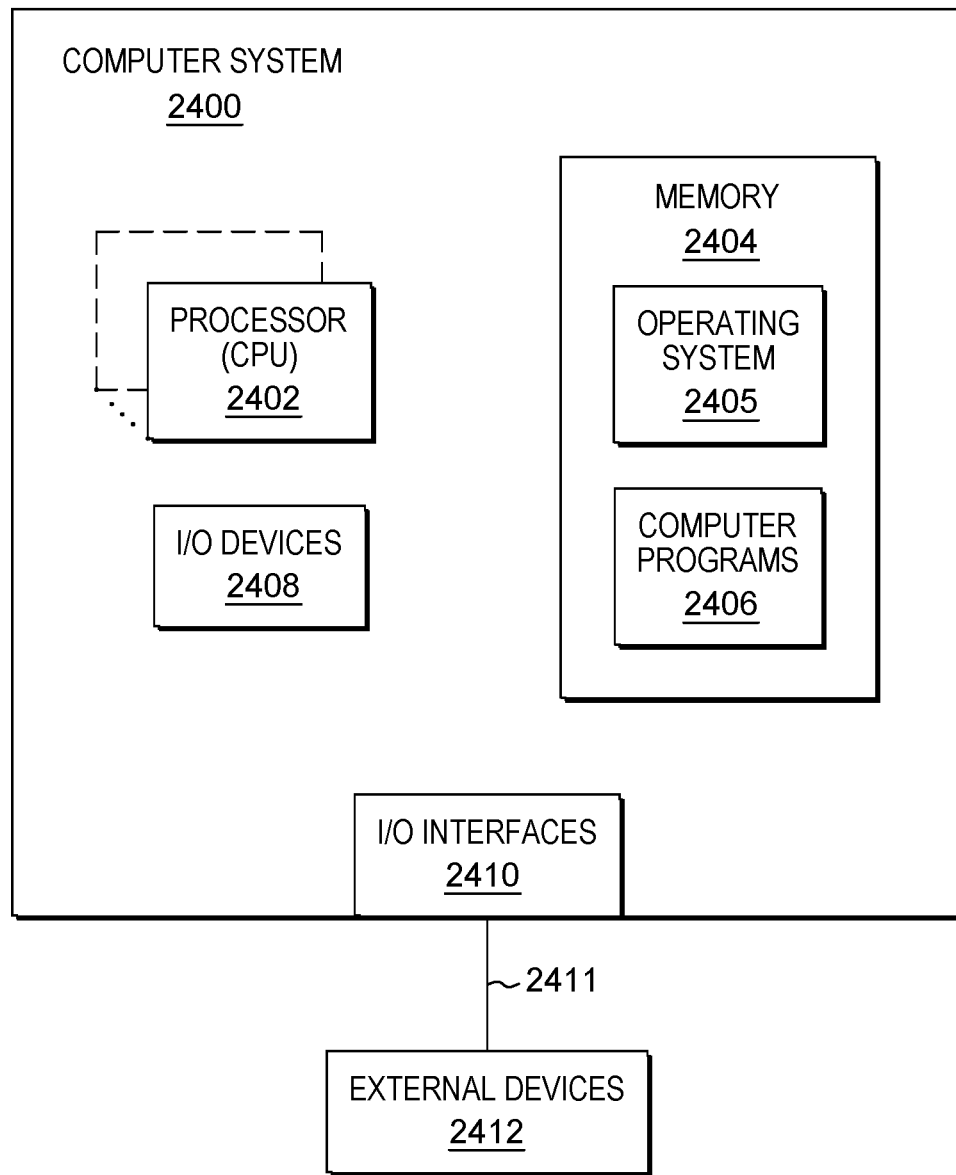
FIG. 24 depicts one example of a computer system and associated devices to incorporate and/or use aspects described herein.

FIG. 24 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by, e.g., ARM Holdings plc (Cambridge, England, United Kingdom), as an example.

FIG. 24 shows a computer system 2400 in communication with external device(s) 2412. An example external device is a dimmer as described herein or a remote entity/server. Additionally or alternatively, computer system 2400 could itself be or include a dimmer or remote entity as described herein.

Computer system 2400 includes one or more processor(s) 2402, for instance central processing unit(s) (CPUs) and/or microprocessors. A processor can include functional components used in the execution of instructions, such as functional components to fetch program instructions from locations such as cache or main memory, decode program instructions, and execute program instructions, access memory for instruction execution, and write results of the executed instructions. A processor 2402 can also include register(s) to be used by one or more of the functional components. Computer system 2400 also includes memory 2404, input/output (I/O) devices 2408, and I/O interfaces 2410, which may be coupled to processor(s) 2402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 2404 can be or include main or system memory (e.g. Random Access Memory) used in the execution of program instructions, storage device(s) such as hard drive(s), flash media, or optical media as examples, and/or cache memory, as examples. Memory 2404 can include, for instance, a cache, such as a shared cache, which may be coupled to local caches (examples include L1 cache, L2 cache, etc.) of processor(s) 2402. Additionally, memory 2404 may be or include at least one computer program product having a set (e.g., at least one) of program modules, instructions, code or the like that is/are configured to carry out functions of embodiments described herein when executed by one or more processors.

Memory 2404 can store an operating system 2405 and other computer programs 2406, such as one or more computer programs/applications that execute to perform aspects described herein. Specifically, programs/applications can include computer readable program instructions that may be configured to carry out functions of embodiments of aspects described herein.

Examples of I/O devices 2408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (2412) coupled to the computer system through one or more I/O interfaces 2410.

Computer system 2400 may communicate with one or more external devices 2412 via one or more I/O interfaces 2410. Example external devices include a keyboard, a pointing device, a display, and/or any other devices that enable a user to interact with computer system 2400. Other example external devices include any device that enables computer system 2400 to communicate with one or more other computing systems or peripheral devices such as a printer. A network interface/adapter is an example I/O interface that enables computer system 2400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 2410 and external devices 2412 can occur across wired and/or wireless communications link(s) 2411, such as Ethernet-based wired or wireless connections. Example wireless connections include cellular, Wi-Fi, Bluetooth®, proximity-based, near-field, or other types of wireless connections. More generally, communications link(s) 2411 may be any appropriate wireless and/or wired communication link(s) for communicating data.

Particular external device(s) 2412 may include one or more data storage devices, which may store one or more programs, one or more computer readable program instructions, and/or data, etc. Computer system 2400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 2400 may be operational with numerous other general purpose or special purpose computing system environments or configurations. Computer system 2400 may take any of various forms, well-known examples of which include, but are not limited to, personal computer (PC) system(s), server computer system(s), messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), systems-on-a-chip (SOCs), telephony device(s), network appliance(s) (such as edge appliance(s)), virtualization device(s), storage controller(s), set top box(es), programmable consumer electronic(s), network PC(s), minicomputer system(s), mainframe computer system(s), electronic dimming systems, dimmer, dimmer switches and the like, and distributed cloud computing environment(s) that include any of the above systems or devices, and the like.

The present invention may be a system, a method, and/or a computer program product, any of which may be configured to perform or facilitate aspects described herein.

In some embodiments, aspects of the present invention may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C #, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples. For example, computing environments of other architectures can be used to incorporate and use one or more embodiments.

Now provided is a small sampling of embodiments of the present invention, as described herein:

A1. A dimmer for controlling conduction of a supply of power to a lighting load, the dimmer comprising: a line input terminal and a load output terminal, the line input terminal configured to be electrically coupled to the supply of power, and the load output terminal configured to be electrically coupled to the lighting load; a switching circuit electrically coupled in series between the line input terminal and the load output terminal, the switching circuit configured to be selectively controlled between an ON state and an OFF state; a memory; and a processing circuit in communication with the memory, wherein the dimmer is configured to perform a method comprising: obtaining a machine learning model, the machine learning model configured for classifying lighting loads into a plurality of different lighting load classes based on properties of electrical current through the lighting loads; based on conducting the supply of power to the lighting load, obtaining electrical current data representing properties of electrical current through the lighting load over a duration of time; applying the machine learning model, using the obtained electrical current data representing properties of electrical current through the lighting load, to classify the lighting load; and performing processing based on the applying, wherein the performing processing comprises configuring the dimmer with one or more dimmer operating parameters that control operation of the dimmer.

A2. The dimmer of A1, wherein the applying classifies the lighting load into a lighting load class of the plurality of different lighting load classes, and wherein the performing processing comprises: identifying, based on the lighting load class into which the lighting load was classified, the one or more dimmer operating parameters as one or more parameters that configure the dimmer for desired lighting load dimming performance by the dimmer; and performing the configuring the dimmer with the identified one or more dimmer operating parameters.

A3. The dimmer of A2, wherein the method further comprises maintaining a database of dimmer operating parameters and associated lighting load classes, each lighting load class of the associated lighting load classes being associated with a respective one or more dimmer operating parameters on a basis that the respective one or more dimmer operating parameters optimizes performance of drive circuitry of lighting loads of that lighting load class to minimize flicker on the lighting load, and wherein the identifying identifies the one or more dimmer operating parameters with which to configure the dimmer as the respective one or more operating parameters associated with the lighting load class into which the lighting load is classified.

A4. The dimmer of A1, wherein the applying fails to classify the lighting load into any lighting load class of the plurality of different lighting load classes, and wherein the performing processing comprises sending the obtained electrical current data to a remote entity.

A5. The dimmer of A4, wherein the machine learning model is an initial machine learning model, and wherein the performing processing further comprises: receiving, in response to the sending, an updated machine learning model; using the updated machine learning model, repeating the applying to classify the lighting load, wherein the repeating the applying classifies the lighting load into a lighting load class indicated by the updated model; identifying, based on the lighting load class indicated by the updated model, the one or more dimmer operating parameters; and performing the configuring the dimmer with the identified one or more dimmer operating parameters.

A6. The dimmer of A4 or A5, wherein the performing processing further comprises: receiving, in response to the sending, an indication of a class of the lighting load; identifying, based on the lighting load class indicated by the updated model, the one or more dimmer operating parameters; and performing the configuring the dimmer with the identified one or more dimmer operating parameters.

A7. The dimmer of A1, A4, A5 or A6, wherein the applying fails to classify the lighting load into any lighting load class of the plurality of different lighting load classes, and wherein the performing processing comprises selecting a default one or more dimmer operating parameters as the one or more dimmer operating parameters with which to configure the dimmer.

A8. The dimmer of A1, A2, A3, A4, A5, A6 or A7, wherein the method further comprises: maintaining the machine learning model as a maintained machine learning model on the dimmer for lighting load classification; periodically or aperiodically receiving from a remote entity an updated machine learning model as part of a firmware update to the dimmer; and replacing the maintained machine learning model with the received updated machine learning model such that the updated machine learning model becomes the maintained machine learning model for lighting load classification.

A9. The dimmer of A1, A2, A3, A4, A5, A6, A7 or A8, wherein the method further comprises triggering provision of an alert to a user indicating whether the applying classifies the lighting load into a lighting load class of the plurality of different lighting load classes.

A10. The dimmer of A1, A2, A3, A4, A5, A6, A7, A8 or A9, wherein the dimmer further comprises a network interface through which the dimmer is connected to a network, and wherein the obtaining obtains the machine learning model through the network interface from a remote entity connected to the network.

A11. The dimmer of A1, A2, A3, A4, A5, A6, A7, A8, A9 or A10, wherein the different lighting load classes correspond to different lamp types having differing internal circuitry and electrical performance thereof.

A12. The dimmer of A11, wherein the different lighting load classes comprise (i) a class for incandescent lamps, (ii) a class for compact fluorescent lamps, and (iii) more than one class for light emitting diode (LED) lamp types, wherein each LED lamp type of the LED lamp types differs from the other LED lamp types based at least on its drive circuitry, and wherein each class of the more than one class corresponds to the drive circuitry of a respective LED lamp type of the LED lamp types.

A13. A method for controlling conduction of a supply of power to a lighting load, the method comprising: obtaining a machine learning model, the machine learning model configured for classifying lighting loads into a plurality of different lighting load classes based on properties of electrical current through the lighting loads; based on conducting a supply of power to the lighting load, obtaining electrical current data representing properties of electrical current through the lighting load over a duration of time;

applying the machine learning model, using the obtained electrical current data representing properties of electrical current through the lighting load, to classify the lighting load; and performing processing based on the applying, wherein the performing processing comprises configuring a dimmer with one or more dimmer operating parameters that control operation of the dimmer.

A14. The method of A13, wherein the applying classifies the lighting load into a lighting load class of the plurality of different lighting load classes, and wherein the performing processing comprises: identifying, based on the lighting load class into which the lighting load was classified, the one or more dimmer operating parameters as one or more parameters that configure the dimmer for desired lighting load dimming performance by the dimmer; and performing the configuring the dimmer with the identified one or more dimmer operating parameters.

A15. The method of A14, further comprising maintaining a database of dimmer operating parameters and associated lighting load classes, each lighting load class of the associated lighting load classes being associated with a respective one or more dimmer operating parameters on a basis that the respective one or more dimmer operating parameters optimizes performance of drive circuitry of lighting loads of that lighting load class to minimize flicker on the lighting load, and wherein the identifying identifies the one or more dimmer operating parameters with which to configure the dimmer as the respective one or more operating parameters associated with the lighting load class into which the lighting load is classified.

A16. The method of A13, wherein the applying fails to classify the lighting load into any lighting load class of the plurality of different lighting load classes, and wherein the performing processing comprises sending the obtained electrical current data to a remote entity.

A17. The method of A16, wherein the machine learning model is an initial machine learning model, and wherein the performing processing further comprises: receiving, in response to the sending, an updated machine learning model; using the updated machine learning model, repeating the applying to classify the lighting load, wherein the repeating the applying classifies the lighting load into a lighting load class indicated by the updated model; identifying, based on the lighting load class indicated by the updated model, the one or more dimmer operating parameters; and performing the configuring the dimmer with the identified one or more dimmer operating parameters.

A18. The method of A16 or A17, wherein the performing processing further comprises: receiving, in response to the sending, an indication of a class of the lighting load; identifying, based on the lighting load class indicated by the updated model, the one or more dimmer operating parameters; and performing the configuring the dimmer with the identified one or more dimmer operating parameters.

A19. The method of A13, A16, A17 or A18, wherein the applying fails to classify the lighting load into any lighting load class of the plurality of different lighting load classes, and wherein the performing processing comprises selecting a default one or more dimmer operating parameters as the one or more dimmer operating parameters with which to configure the dimmer.

A20. The method of A13, A14, A15, A16, A17, A18 or A19 further comprising: maintaining the machine learning model as a maintained machine learning model on the dimmer for lighting load classification; periodically or aperiodically receiving from a remote entity an updated machine learning model as part of a firmware update to the dimmer; and replacing the maintained machine learning model with the received updated machine learning model such that the updated machine learning model becomes the maintained machine learning model for lighting load classification.

A21. The method of A13, A14, A15, A16, A17, A18, A19 or A20, further comprising triggering provision of an alert to a user indicating whether the applying classifies the lighting load into a lighting load class of the plurality of different lighting load classes.

A22. The method of A13, A14, A15, A16, A17, A18, A19, A20 or A21, wherein the obtaining obtains the machine learning model through a network interface of the dimmer from a remote entity connected to the network.

A23. The method of A13, A14, A15, A16, A17, A18, A19, A20, A21 or A22, wherein the different lighting load classes correspond to different lamp types having differing internal circuitry and electrical performance thereof.

A24. The method of A23, wherein the different lighting load classes comprise (i) a class for incandescent lamps, (ii) a class for compact fluorescent lamps, and (iii) more than one class for light emitting diode (LED) lamp types, wherein each LED lamp type of the LED lamp types differs from the other LED lamp types based at least on its drive circuitry, and wherein each class of the more than one class corresponds to the drive circuitry of a respective LED lamp type of the LED lamp types.

A25. A computer program product for controlling operation of a dimmer, the computer program product comprising: a computer readable storage medium readable by a processing circuit and storing instructions for execution by the processing circuit to perform a method comprising: obtaining a machine learning model, the machine learning model configured for classifying lighting loads into a plurality of different lighting load classes based on properties of electrical current through the lighting loads; based on conducting a supply of power to the lighting load, obtaining electrical current data representing properties of electrical current through the lighting load over a duration of time; applying the machine learning model, using the obtained electrical current data representing properties of electrical current through the lighting load, to classify the lighting load; and performing processing based on the applying, wherein the performing processing comprises configuring the dimmer with one or more dimmer operating parameters that control operation of the dimmer.

A26. The computer program product of A25, wherein the applying classifies the lighting load into a lighting load class of the plurality of different lighting load classes, and wherein the performing processing comprises: identifying, based on the lighting load class into which the lighting load was classified, the one or more dimmer operating parameters as one or more parameters that configure the dimmer for desired lighting load dimming performance by the dimmer; and performing the configuring the dimmer with the identified one or more dimmer operating parameters.

A27. The computer program product of A26, wherein the method further comprises maintaining a database of dimmer operating parameters and associated lighting load classes, each lighting load class of the associated lighting load classes being associated with a respective one or more dimmer operating parameters on a basis that the respective one or more dimmer operating parameters optimizes performance of drive circuitry of lighting loads of that lighting load class to minimize flicker on the lighting load, and wherein the identifying identifies the one or more dimmer operating parameters with which to configure the dimmer as the respective one or more operating parameters associated with the lighting load class into which the lighting load is classified.

A28. The computer program product of A25, wherein the applying fails to classify the lighting load into any lighting load class of the plurality of different lighting load classes, and wherein the performing processing comprises sending the obtained electrical current data to a remote entity.

A29. The computer program product of A28, wherein the machine learning model is an initial machine learning model, and wherein the performing processing further comprises: receiving, in response to the sending, an updated machine learning model; using the updated machine learning model, repeating the applying to classify the lighting load, wherein the repeating the applying classifies the lighting load into a lighting load class indicated by the updated model; identifying, based on the lighting load class indicated by the updated model, the one or more dimmer operating parameters; and performing the configuring the dimmer with the identified one or more dimmer operating parameters.

A30. The computer program product of A28 or A29, wherein the performing processing further comprises: receiving, in response to the sending, an indication of a class of the lighting load; identifying, based on the lighting load class indicated by the updated model, the one or more dimmer operating parameters; and performing the configuring the dimmer with the identified one or more dimmer operating parameters.

A31. The computer program product of A25, A28, A29 or A30, wherein the applying fails to classify the lighting load into any lighting load class of the plurality of different lighting load classes, and wherein the performing processing comprises selecting a default one or more dimmer operating parameters as the one or more dimmer operating parameters with which to configure the dimmer.

A32. The computer program product of A25, A26, A27, A28, A29, A30 or A31, wherein the method further comprises: maintaining the machine learning model as a maintained machine learning model on the dimmer for lighting load classification; periodically or aperiodically receiving from a remote entity an updated machine learning model as part of a firmware update to the dimmer; and replacing the maintained machine learning model with the received updated machine learning model such that the updated machine learning model becomes the maintained machine learning model for lighting load classification.

A33. The computer program product of A25, A26, A27, A28, A29, A30, A31 or A32, wherein the method further comprises triggering provision of an alert to a user indicating whether the applying classifies the lighting load into a lighting load class of the plurality of different lighting load classes.

A34. The computer program product of A25, A26, A27, A28, A29, A30, A31, A32 or A33, wherein the obtaining obtains the machine learning model through a network interface of the dimmer from a remote entity connected to the network.

A35. The computer program product of A25, A26, A27, A28, A29, A30, A31, A32, A33 or A34, wherein the different lighting load classes correspond to different lamp types having differing internal circuitry and electrical performance thereof.

A36. The computer program product of A35, wherein the different lighting load classes comprise (i) a class for incandescent lamps, (ii) a class for compact fluorescent lamps, and (iii) more than one class for light emitting diode (LED) lamp types, wherein each LED lamp type of the LED lamp types differs from the other LED lamp types based at least on its drive circuitry, and wherein each class of the more than one class corresponds to the drive circuitry of a respective LED lamp type of the LED lamp types.

B1. A dimmer for controlling conduction of a supply of power to a lighting load, the dimmer comprising: a line input terminal and a load output terminal, the line input terminal configured to be electrically coupled to the supply of power, and the load output terminal configured to be electrically coupled to the lighting load; a switching circuit electrically coupled in series between the line input terminal and the load output terminal, the switching circuit configured to be selectively controlled between an ON state and an OFF state; a memory; and a processing circuit in communication with the memory, wherein the dimmer is configured to perform a method comprising: based on conducting the supply of power to the lighting load, obtaining electrical current data representing properties of electrical current through the lighting load over a duration of time; sending the electrical current data to a remote entity; and based on a classification of the lighting load, the classification being based on the sent electrical current data, configuring the dimmer with one or more dimmer operating parameters that control operation of the dimmer.

B2. The dimmer of B1, wherein the method further comprises: receiving from the remote entity an indication of a lighting load class into which the lighting load is classified; and identifying the one or more dimmer operating parameters based on the indication of the lighting load class.

B3. The dimmer of B2, wherein the method further comprises: maintaining a database of dimmer operating parameters and associated lighting load classes, each lighting load class of the associated lighting load classes being associated with a respective one or more dimmer operating parameters on a basis that the respective one or more dimmer operating parameters optimizes performance of drive circuitry of lighting loads of that lighting load class to minimize flicker on the lighting load; and identifying the one or more dimmer operating parameters with which to configure the dimmer as the respective one or more operating parameters associated with the lighting load class into which the lighting load is classified.

B4. The dimmer of B1 or B2, wherein the method further comprises receiving from the remote entity the one or more dimmer operating parameters, the one or more dimmer operating parameters identified based on a lighting load class into which the lighting load is classified.

B5. The dimmer of B1, B2, B3 or B4, wherein the method further comprises triggering provision of an alert to a user indicating whether the lighting load is successfully classified into a lighting load class.

B6. The dimmer of B1, B2, B3, B4 or B5, wherein the classification of the lighting load comprises a classification into a lighting load class of a plurality of different lighting load classes that correspond to different lamp types having differing internal circuitry and electrical performance thereof.

B7. The dimmer of B6, wherein the different lighting load classes comprise (i) a class for incandescent lamps, (ii) a class for compact fluorescent lamps, and (iii) more than one class for light emitting diode (LED) lamp types, wherein each LED lamp type of the LED lamp types differs from the other LED lamp types based at least on its drive circuitry, and wherein each class of the more than one class corresponds to the drive circuitry of a respective LED lamp type of the LED lamp types.

B8. A method for controlling operation of a dimmer, the method comprising: based on conducting a supply of power to a lighting load, obtaining electrical current data representing properties of electrical current through the lighting load over a duration of time; sending the electrical current data to a remote entity; and based on a classification of the lighting load, the classification being based on the sent electrical current data, configuring the dimmer with one or more dimmer operating parameters that control operation of the dimmer.

B9. The method of B8, further comprising: receiving from the remote entity an indication of a lighting load class into which the lighting load is classified; and identifying the one or more dimmer operating parameters based on the indication of the lighting load class.

B10. The method of B9, further comprising: maintaining a database of dimmer operating parameters and associated lighting load classes, each lighting load class of the associated lighting load classes being associated with a respective one or more dimmer operating parameters on a basis that the respective one or more dimmer operating parameters optimizes performance of drive circuitry of lighting loads of that lighting load class to minimize flicker on the lighting load; and identifying the one or more dimmer operating parameters with which to configure the dimmer as the respective one or more operating parameters associated with the lighting load class into which the lighting load is classified.

B11. The method of B8 or B9, further comprising receiving from the remote entity the one or more dimmer operating parameters, the one or more dimmer operating parameters identified based on a lighting load class into which the lighting load is classified.

B12. The method of B8, B9, B10 or B11, further comprising triggering provision of an alert to a user indicating whether the lighting load is successfully classified into a lighting load class.

B13. The method of B8, B9, B10, B11 or B12, wherein the classification of the lighting load comprises a classification into a lighting load class of a plurality of different lighting load classes that correspond to different lamp types having differing internal circuitry and electrical performance thereof.

B14. The method of B13, wherein the different lighting load classes comprise (i) a class for incandescent lamps, (ii) a class for compact fluorescent lamps, and (iii) more than one class for light emitting diode (LED) lamp types, wherein each LED lamp type of the LED lamp types differs from the other LED lamp types based at least on its drive circuitry, and wherein each class of the more than one class corresponds to the drive circuitry of a respective LED lamp type of the LED lamp types.

B15. A computer program product for controlling operation of a dimmer, the computer program product comprising: a computer readable storage medium readable by a processing circuit and storing instructions for execution by the processing circuit to perform a method comprising: based on conducting a supply of power to a lighting load, obtaining electrical current data representing properties of electrical current through the lighting load over a duration of time; sending the electrical current data to a remote entity; and based on a classification of the lighting load, the classification being based on the sent electrical current data, configuring the dimmer with one or more dimmer operating parameters that control operation of the dimmer.

B16. The computer program product of B15, wherein the method further comprises: receiving from the remote entity an indication of a lighting load class into which the lighting load is classified; and identifying the one or more dimmer operating parameters based on the indication of the lighting load class.

B17. The computer program product of B16, wherein the method further comprises: maintaining a database of dimmer operating parameters and associated lighting load classes, each lighting load class of the associated lighting load classes being associated with a respective one or more dimmer operating parameters on a basis that the respective one or more dimmer operating parameters optimizes performance of drive circuitry of lighting loads of that lighting load class to minimize flicker on the lighting load; and identifying the one or more dimmer operating parameters with which to configure the dimmer as the respective one or more operating parameters associated with the lighting load class into which the lighting load is classified.

B18. The computer program product of B15 or B16, wherein the method further comprises receiving from the remote entity the one or more dimmer operating parameters, the one or more dimmer operating parameters identified based on a lighting load class into which the lighting load is classified.

B19. The computer program product of B15, B16, B17 or B18, wherein the method further comprises triggering provision of an alert to a user indicating whether the lighting load is successfully classified into a lighting load class.

B20. The computer program product of B15, B16, B17, B18 or B19, wherein the classification of the lighting load comprises a classification into a lighting load class of a plurality of different lighting load classes that correspond to different lamp types having differing internal circuitry and electrical performance thereof.

B21. The computer program product of B20, wherein the different lighting load classes comprise (i) a class for incandescent lamps, (ii) a class for compact fluorescent lamps, and (iii) more than one class for light emitting diode (LED) lamp types, wherein each LED lamp type of the LED lamp types differs from the other LED lamp types based at least on its drive circuitry, and wherein each class of the more than one class corresponds to the drive circuitry of a respective LED lamp type of the LED lamp types.

C1. A computer system comprising: a memory; and a processing circuit in communication with the memory, wherein the computer system is configured to perform a method comprising: maintaining a machine learning model, the machine learning model configured for classifying lighting loads into a plurality of different lighting load classes based on properties of electrical current through the lighting loads; obtaining, from a dimmer, electrical current data representing properties of electrical current through a lighting load over a duration of time; applying the machine learning model, using the obtained electrical current data representing properties of electrical current through the lighting load, to classify the lighting load; and performing processing based on the applying.

C2. The computer system of C1, wherein the applying classifies the lighting load into a lighting load class of the plurality of different lighting load classes.

C3. The computer system of C2, wherein the performing processing further comprises at least one selected from the group consisting of: sending to the dimmer an indication of the lighting load class; and sending to the dimmer one or more dimmer operating parameters that control operation of the dimmer, the one or more dimmer operating parameters identified based on the lighting load class into which the lighting load is classified.

C4. The computer system of C1, C2 or C3, wherein the method further comprises maintaining a database of dimmer operating parameters and associated lighting load classes, each lighting load class of the associated lighting load classes being associated with a respective one or more dimmer operating parameters on a basis that the respective one or more dimmer operating parameters optimizes performance of drive circuitry of lighting loads of that lighting load class to minimize flicker on the lighting load.

C5. The computer system of C4, wherein the applying classifies the lighting load into a lighting load class of the associated lighting load classes, and wherein the method further comprises: identifying the respective one or more dimmer operating parameters associated with the lighting load class into which the lighting load is classified; and sending to the dimmer the respective one or more dimmer operating parameters.

C6. The computer system of C4 or C5, wherein the method further comprises sending the database to the dimmer.

C7. The computer system of C1 or C4, wherein the applying fails to classify the lighting load into any lighting load class of the plurality of different lighting load classes, and wherein the performing processing comprises sending to the dimmer an indication of a default, the default not included in the plurality of different lighting load classes.

C8. The computer system of C7, wherein the default is associated with a default one or more dimmer operating parameters that control operation of the dimmer.

C9. The computer system of C1 or C4, wherein the applying fails to classify the lighting load into any lighting load class of the plurality of lighting load classes, and wherein the performing processing comprises indicating to the dimmer that the class of the lighting load is unknown.

C10. The computer system of C1, C2, C3, C4, C5, C6, C7, C8 or C9, wherein the method further comprises: obtaining a set of electrical current data representing properties of electrical current through each lighting load of a collection of different lighting loads; and building the machine learning model using a machine learning algorithm and the obtained set of electrical current data, the building comprising training the machine learning model using at least the obtained set of electrical current data.

C11. The computer system of C10, wherein the obtained set of electrical current data comprises an initial dataset of sampled current level values along a current waveform having a phase, the sampled current level values being sampled at corresponding angles of the phase, and wherein the method further comprises augmenting the obtained set of electrical current data, the augmenting comprising: applying a phase shift to the sampled current level values of the initial dataset to produce another dataset, the another dataset having current level values at corresponding shifted angles of the phase; and iterating the applying through a plurality of different phase shifts, wherein the iterating provides augmented electrical current data, and wherein the training trains the machine learning model using the augmented electrical current data.

C12. The computer system of C1, C2, C3, C4, C5, C6, C7, C8, C9, C10 or C11, wherein the method further comprises: receiving electrical current data representing properties of electrical current through other lighting loads; and retraining the machine learning model based on the received electrical current data, wherein the retraining provides an updated machine learning model for subsequent classification of additional lighting loads.

C13. The computer system of C1, C2, C3, C4, C5, C6, C7, C8, C9, C10, C11 or C12, wherein the different lighting load classes correspond to different lamp types having differing internal circuitry and electrical performance thereof.

C14. The computer system of C13, wherein the different lighting load classes comprise (i) a class for incandescent lamps, (ii) a class for compact fluorescent lamps, and (iii) more than one class for light emitting diode (LED) lamp types, wherein each LED lamp type of the LED lamp types differs from the other LED lamp types based at least on its drive circuitry, and wherein each class of the more than one class corresponds to the drive circuitry of a respective LED lamp type of the LED lamp types.

C15. A method comprising: maintaining a machine learning model, the machine learning model configured for classifying lighting loads into a plurality of different lighting load classes based on properties of electrical current through the lighting loads; obtaining, from a dimmer, electrical current data representing properties of electrical current through a lighting load over a duration of time; applying the machine learning model, using the obtained electrical current data representing properties of electrical current through the lighting load, to classify the lighting load; and performing processing based on the applying.

C16. The method of C15, wherein the applying classifies the lighting load into a lighting load class of the plurality of different lighting load classes.

C17. The method of C16, wherein the performing processing further comprises at least one selected from the group consisting of: sending to the dimmer an indication of the lighting load class; and sending to the dimmer one or more dimmer operating parameters that control operation of the dimmer, the one or more dimmer operating parameters identified based on the lighting load class into which the lighting load is classified.

C18. The method of C15, C16 or C17, further comprising maintaining a database of dimmer operating parameters and associated lighting load classes, each lighting load class of the associated lighting load classes being associated with a respective one or more dimmer operating parameters on a basis that the respective one or more dimmer operating parameters optimizes performance of drive circuitry of lighting loads of that lighting load class to minimize flicker on the lighting load.

C19. The method of C18 or C19, wherein the applying classifies the lighting load into a lighting load class of the associated lighting load classes, and wherein the method further comprises: identifying the respective one or more dimmer operating parameters associated with the lighting load class into which the lighting load is classified; and sending to the dimmer the respective one or more dimmer operating parameters.

C20. The method of C18 or C19, wherein further comprising sending the database to the dimmer.

C21. The method of C15 or C18, wherein the applying fails to classify the lighting load into any lighting load class of the plurality of different lighting load classes, and wherein the performing processing comprises sending to the dimmer an indication of a default, the default not included in the plurality of different lighting load classes.

C22. The method of C21, wherein the default is associated with a default one or more dimmer operating parameters that control operation of the dimmer.

C23. The method of C15 or C18, wherein the applying fails to classify the lighting load into any lighting load class of the plurality of lighting load classes, and wherein the performing processing comprises indicating to the dimmer that the class of the lighting load is unknown.

C24. The method of C15, C16, C17, C18, C19, C20, C21, C22 or C23, further comprising: obtaining a set of electrical current data representing properties of electrical current through each lighting load of a collection of different lighting loads; and building the machine learning model using a machine learning algorithm and the obtained set of electrical current data, the building comprising training the machine learning model using at least the obtained set of electrical current data.

C25. The method of C24, wherein the obtained set of electrical current data comprises an initial dataset of sampled current level values along a current waveform having a phase, the sampled current level values being sampled at corresponding angles of the phase, and wherein the method further comprises augmenting the obtained set of electrical current data, the augmenting comprising: applying a phase shift to the sampled current level values of the initial dataset to produce another dataset, the another dataset having current level values at corresponding shifted angles of the phase; and iterating the applying through a plurality of different phase shifts, wherein the iterating provides augmented electrical current data, and wherein the training trains the machine learning model using the augmented electrical current data.

C26. The method of C15, C16, C17, C18, C19, C20, C21, C22, C23, C24 or C25, further comprising: receiving electrical current data representing properties of electrical current through other lighting loads; and retraining the machine learning model based on the received electrical current data, wherein the retraining provides an updated machine learning model for subsequent classification of additional lighting loads.

C27. The method of C15, C16, C17, C18, C19, C20, C21, C22, C23, C24, C25 or C26, wherein the different lighting load classes correspond to different lamp types having differing internal circuitry and electrical performance thereof.

C28. The method of C27, wherein the different lighting load classes comprise (i) a class for incandescent lamps, (ii) a class for compact fluorescent lamps, and (iii) more than one class for light emitting diode (LED) lamp types, wherein each LED lamp type of the LED lamp types differs from the other LED lamp types based at least on its drive circuitry, and wherein each class of the more than one class corresponds to the drive circuitry of a respective LED lamp type of the LED lamp types.

C29. A computer program product comprising: a computer readable storage medium readable by a processing circuit and storing instructions for execution by the processing circuit to perform a method comprising: maintaining a machine learning model, the machine learning model configured for classifying lighting loads into a plurality of different lighting load classes based on properties of electrical current through the lighting loads; obtaining, from a dimmer, electrical current data representing properties of electrical current through a lighting load over a duration of time; applying the machine learning model, using the obtained electrical current data representing properties of electrical current through the lighting load, to classify the lighting load; and performing processing based on the applying.

C30. The computer program product of C29, wherein the applying classifies the lighting load into a lighting load class of the plurality of different lighting load classes.

C31. The computer program product of C30, wherein the performing processing further comprises at least one selected from the group consisting of: sending to the dimmer an indication of the lighting load class; and sending to the dimmer one or more dimmer operating parameters that control operation of the dimmer, the one or more dimmer operating parameters identified based on the lighting load class into which the lighting load is classified.

C32. The computer program product of C29, C30 or C31, wherein the method further comprises maintaining a database of dimmer operating parameters and associated lighting load classes, each lighting load class of the associated lighting load classes being associated with a respective one or more dimmer operating parameters on a basis that the respective one or more dimmer operating parameters optimizes performance of drive circuitry of lighting loads of that lighting load class to minimize flicker on the lighting load.

C33. The computer program product of C32, wherein the applying classifies the lighting load into a lighting load class of the associated lighting load classes, and wherein the performing processing further comprises: identifying the respective one or more dimmer operating parameters associated with the lighting load class into which the lighting load is classified; and sending to the dimmer the respective one or more dimmer operating parameters.

C34. The computer program product of C32 or C33, wherein the method further comprises sending the database to the dimmer.

C35. The computer program product of C29 or C32, wherein the applying fails to classify the lighting load into any lighting load class of the plurality of different lighting load classes, and wherein the performing processing comprises sending to the dimmer an indication of a default, the default not included in the plurality of different lighting load classes.

C36. The computer program product of C35, wherein the default is associated with a default one or more dimmer operating parameters that control operation of the dimmer.

C37. The computer program product of C29 or C32, wherein the applying fails to classify the lighting load into any lighting load class of the plurality of lighting load classes, and wherein the performing processing comprises indicating to the dimmer that the class of the lighting load is unknown.

C38. The computer program product of C29, C30, C31, C32, C33, C34, C35, C36 or C37, wherein the method further comprises: obtaining a set of electrical current data representing properties of electrical current through each lighting load of a collection of different lighting loads; and building the machine learning model using a machine learning algorithm and the obtained set of electrical current data, the building comprising training the machine learning model using at least the obtained set of electrical current data.

C39. The computer program product of C38, wherein the obtained set of electrical current data comprises an initial dataset of sampled current level values along a current waveform having a phase, the sampled current level values being sampled at corresponding angles of the phase, and wherein the method further comprises augmenting the obtained set of electrical current data, the augmenting comprising: applying a phase shift to the sampled current level values of the initial dataset to produce another dataset, the another dataset having current level values at corresponding shifted angles of the phase; and iterating the applying through a plurality of different phase shifts, wherein the iterating provides augmented electrical current data, and wherein the training trains the machine learning model using the augmented electrical current data.

C40. The computer program product of C29, C30, C31, C32, C33, C34, C35, C36, C37, C38 or C39, wherein the method further comprises: receiving electrical current data representing properties of electrical current through other lighting loads; and retraining the machine learning model based on the received electrical current data, wherein the retraining provides an updated machine learning model for subsequent classification of additional lighting loads.

C41. The computer program product of C29, C30, C31, C32, C33, C34, C35, C36, C37, C38, C39 or C40, wherein the different lighting load classes correspond to different lamp types having differing internal circuitry and electrical performance thereof.

C42. The computer program product of C41, wherein the different lighting load classes comprise (i) a class for incandescent lamps, (ii) a class for compact fluorescent lamps, and (iii) more than one class for light emitting diode (LED) lamp types, wherein each LED lamp type of the LED lamp types differs from the other LED lamp types based at least on its drive circuitry, and wherein each class of the more than one class corresponds to the drive circuitry of a respective LED lamp type of the LED lamp types.

D1. A computer system comprising: a memory; and a processing circuit in communication with the memory, wherein the computer system is configured to perform a method comprising: obtaining a set of electrical current data representing properties of electrical current through each lighting load of a collection of different lighting loads; building a machine learning model using a machine learning algorithm and the obtained set of electrical current data, the machine learning model configured for classifying lighting loads into a plurality of different lighting load classes based on properties of electrical current through the lighting loads, and the building comprising training the machine learning model using at least the obtained set of electrical current data; and sending the machine learning model to a dimmer for lighting load classification.

D2. The computer system of D1, wherein the obtained set of electrical current data comprises an initial dataset of sampled current level values along a current waveform having a phase, the sampled current level values being sampled at corresponding angles of the phase, and wherein the method further comprises augmenting the obtained set of electrical current data, the augmenting comprising: applying a phase shift to the sampled current level values of the initial dataset to produce another dataset, the another dataset having current level values at corresponding shifted angles of the phase; and iterating the applying through a plurality of different phase shifts, wherein the iterating provides augmented electrical current data, and wherein the training trains the machine learning model using the augmented electrical current data.

D3. The computer system of D1 or D2, wherein the method further comprises: receiving electrical current data representing properties of electrical current through other lighting loads; and retraining the machine learning model based on the received electrical current data, wherein the retraining provides an updated machine learning model.

D4. The computer system of D3, wherein the method further comprises: receiving, from the dimmer, electrical current data representing properties of electrical current through a target lighting load for classification; applying the updated machine learning model, using the received electrical current data representing properties of electrical current through the target lighting load, to classify the target lighting load into a lighting load class; and performing at least one selected from the group comprising: sending to the dimmer an indication of the lighting load class; and sending to the dimmer one or more dimmer operating parameters that control operation of the dimmer, the one or more dimmer operating parameters identified based on the lighting load class into which the target lighting load is classified.

D5. The computer system of D3 or D4, wherein the method further comprises sending the updated machine learning model to the dimmer as part of a firmware update to the dimmer.

D6. The computer system of D1, D2, D3, D4 or D5, wherein the method further comprises: maintaining a database of dimmer operating parameters and associated lighting load classes, each lighting load class of the associated lighting load classes being associated with a respective one or more dimmer operating parameters on a basis that the respective one or more dimmer operating parameters optimizes performance of drive circuitry of lighting loads of that lighting load class to minimize flicker on the lighting load; and sending the database to the dimmer.

D7. The computer system of D1, D2, D3, D4, D5 or D6, wherein the different lighting load classes correspond to different lamp types having differing internal circuitry and electrical performance thereof.

D8. The computer system of D7, wherein the different lighting load classes comprise (i) a class for incandescent lamps, (ii) a class for compact fluorescent lamps, and (iii) more than one class for light emitting diode (LED) lamp types, wherein each LED lamp type of the LED lamp types differs from the other LED lamp types based at least on its drive circuitry, and wherein each class of the more than one class corresponds to the drive circuitry of a respective LED lamp type of the LED lamp types.

D9. A method comprising: obtaining a set of electrical current data representing properties of electrical current through each lighting load of a collection of different lighting loads; building a machine learning model using a machine learning algorithm and the obtained set of electrical current data, the machine learning model configured for classifying lighting loads into a plurality of different lighting load classes based on properties of electrical current through the lighting loads, and the building comprising training the machine learning model using at least the obtained set of electrical current data; and sending the machine learning model to a dimmer for lighting load classification.

D10. The method of D9, wherein the obtained set of electrical current data comprises an initial dataset of sampled current level values along a current waveform having a phase, the sampled current level values being sampled at corresponding angles of the phase, and wherein the method further comprises augmenting the obtained set of electrical current data, the augmenting comprising: applying a phase shift to the sampled current level values of the initial dataset to produce another dataset, the another dataset having current level values at corresponding shifted angles of the phase; and iterating the applying through a plurality of different phase shifts, wherein the iterating provides augmented electrical current data, and wherein the training trains the machine learning model using the augmented electrical current data.

D11. The method of D9 or D10, further comprising: receiving electrical current data representing properties of electrical current through other lighting loads; and retraining the machine learning model based on the received electrical current data, wherein the retraining provides an updated machine learning model.

D12. The method of D11, further comprising: receiving, from the dimmer, electrical current data representing properties of electrical current through a target lighting load for classification; applying the updated machine learning model, using the received electrical current data representing properties of electrical current through the target lighting load, to classify the target lighting load into a lighting load class; and performing at least one selected from the group comprising: sending to the dimmer an indication of the lighting load class; and sending to the dimmer one or more dimmer operating parameters that control operation of the dimmer, the one or more dimmer operating parameters identified based on the lighting load class into which the target lighting load is classified.

D13. The method of D11 or D12, further comprising sending the updated machine learning model to the dimmer as part of a firmware update to the dimmer.

D14. The method of D9, D10, D11, D12 or D13, further comprising: maintaining a database of dimmer operating parameters and associated lighting load classes, each lighting load class of the associated lighting load classes being associated with a respective one or more dimmer operating parameters on a basis that the respective one or more dimmer operating parameters optimizes performance of drive circuitry of lighting loads of that lighting load class to minimize flicker on the lighting load; and sending the database to the dimmer.

D15. The method of D9, D10, D11, D12, D13 or D14, wherein the different lighting load classes correspond to different lamp types having differing internal circuitry and electrical performance thereof.

D16. The method of D15, wherein the different lighting load classes comprise (i) a class for incandescent lamps, (ii) a class for compact fluorescent lamps, and (iii) more than one class for light emitting diode (LED) lamp types, wherein each LED lamp type of the LED lamp types differs from the other LED lamp types based at least on its drive circuitry, and wherein each class of the more than one class corresponds to the drive circuitry of a respective LED lamp type of the LED lamp types.

D17. A computer program product comprising: a computer readable storage medium readable by a processing circuit and storing instructions for execution by the processing circuit to perform a method comprising: obtaining a set of electrical current data representing properties of electrical current through each lighting load of a collection of different lighting loads; building a machine learning model using a machine learning algorithm and the obtained set of electrical current data, the machine learning model configured for classifying lighting loads into a plurality of different lighting load classes based on properties of electrical current through the lighting loads, and the building comprising training the machine learning model using at least the obtained set of electrical current data; and sending the machine learning model to a dimmer for lighting load classification.

D18. The computer program product of D17, wherein the obtained set of electrical current data comprises an initial dataset of sampled current level values along a current waveform having a phase, the sampled current level values being sampled at corresponding angles of the phase, and wherein the method further comprises augmenting the obtained set of electrical current data, the augmenting comprising: applying a phase shift to the sampled current level values of the initial dataset to produce another dataset, the another dataset having current level values at corresponding shifted angles of the phase; and iterating the applying through a plurality of different phase shifts, wherein the iterating provides augmented electrical current data, and wherein the training trains the machine learning model using the augmented electrical current data.

D19. The computer program product of D17 or D18, wherein the method further comprises: receiving electrical current data representing properties of electrical current through other lighting loads; and retraining the machine learning model based on the received electrical current data, wherein the retraining provides an updated machine learning model.

D20. The computer program product of D19, wherein the method further comprises: receiving, from the dimmer, electrical current data representing properties of electrical current through a target lighting load for classification; applying the updated machine learning model, using the received electrical current data representing properties of electrical current through the target lighting load, to classify the target lighting load into a lighting load class; and performing at least one selected from the group comprising: sending to the dimmer an indication of the lighting load class; and sending to the dimmer one or more dimmer operating parameters that control operation of the dimmer, the one or more dimmer operating parameters identified based on the lighting load class into which the target lighting load is classified.

D21. The computer program product of D19 or D20, wherein the method further comprises sending the updated machine learning model to the dimmer as part of a firmware update to the dimmer.

D22. The computer program product of D17, D18, D19, D20 or D21, wherein the method further comprises: maintaining a database of dimmer operating parameters and associated lighting load classes, each lighting load class of the associated lighting load classes being associated with a respective one or more dimmer operating parameters on a basis that the respective one or more dimmer operating parameters optimizes performance of drive circuitry of lighting loads of that lighting load class to minimize flicker on the lighting load; and sending the database to the dimmer.

D23. The computer program product of D17, D18, D19, D20, D21 or D22, wherein the different lighting load classes correspond to different lamp types having differing internal circuitry and electrical performance thereof.

D24. The computer program product of D23, wherein the different lighting load classes comprise (i) a class for incandescent lamps, (ii) a class for compact fluorescent lamps, and (iii) more than one class for light emitting diode (LED) lamp types, wherein each LED lamp type of the LED lamp types differs from the other LED lamp types based at least on its drive circuitry, and wherein each class of the more than one class corresponds to the drive circuitry of a respective LED lamp type of the LED lamp types.

E1. A method for controlling operation of a dimmer, the method comprising: conducting a supply of power to a lighting load; based on the conducting, obtaining electrical current data representing properties of electrical current through the lighting load over a duration of time; and based on a classification of the lighting load, the classification being based on the electrical current data, configuring the dimmer with one or more dimmer operating parameters that control operation of the dimmer.

E2. The method of E1, further comprising sending the electrical current data to a remote entity, wherein the classification is performed by the remote entity based on receiving the sent electrical current data.

E3. The method of E2, further comprising: maintaining a database of dimmer operating parameters and associated lighting load classes, each lighting load class of the associated lighting load classes being associated with a respective one or more dimmer operating parameters on a basis that the respective one or more dimmer operating parameters optimizes performance of drive circuitry of lighting loads of that lighting load class to minimize flicker on the lighting load; receiving from the remote entity an indication of a lighting load class into which the lighting load is classified; and identifying from the maintained database the one or more dimmer operating parameters with which to configure the dimmer as the one or more operating parameters associated with the lighting load class into which the lighting load is classified.

E4. The method of E2, further comprising receiving from the remote entity the one or more dimmer operating parameters, the one or more dimmer operating parameters identified based on a lighting load class into which the lighting load is classified.

E5. The method of E1, wherein the classification of the lighting load comprises a classification into a lighting load class of a plurality of different lighting load classes that correspond to different lamp types having differing internal circuitry and electrical performance thereof, wherein the different lighting load classes comprise (i) a class for incandescent lamps, (ii) a class for compact fluorescent lamps, and (iii) more than one class for light emitting diode (LED) lamp types, wherein each LED lamp type of the LED lamp types differs from the other LED lamp types based at least on its drive circuitry, and wherein each class of the more than one class corresponds to the drive circuitry of a respective LED lamp type of the LED lamp types.

E6. The method of E1, further comprising: obtaining a machine learning model, the machine learning model configured for classifying lighting loads into a plurality of different lighting load classes based on properties of electrical current through the lighting loads; performing the classification of the lighting load, the performing the classification comprising applying the machine learning model, using the obtained electrical current data representing properties of electrical current through the lighting load, to classify the lighting load; and identifying, based on the classification, the one or more dimmer operating parameters to control operation of the dimmer.

E7. The method of E6, further comprising: maintaining a database of dimmer operating parameters and associated lighting load classes, each lighting load class of the associated lighting load classes being associated with a respective one or more dimmer operating parameters on a basis that the respective one or more dimmer operating parameters optimizes performance of drive circuitry of lighting loads of that lighting load class to minimize flicker on the lighting load; and identifying from the maintained database the one or more dimmer operating parameters with which to configure the dimmer as the one or more operating parameters associated with the lighting load class into which the lighting load is classified.

Computer program products storing program instructions for execution to perform aspects of E1 through E7, and computer systems configured to perform aspects of E1 through E7 are also possible.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A dimmer for controlling conduction of a supply of power to a lighting load, the dimmer comprising:
    a line input terminal and a load output terminal, the line input terminal configured to be electrically coupled to the supply of power, and the load output terminal configured to be electrically coupled to the lighting load;
    a switching circuit electrically coupled in series between the line input terminal and the load output terminal, the switching circuit configured to be selectively controlled between an ON state and an OFF state;
    a memory; and
    a processing circuit in communication with the memory, wherein the dimmer is configured to perform a method comprising:
        obtaining a machine learning model, the machine learning model configured for classifying lighting loads into a plurality of different lighting load classes based on properties of electrical current through the lighting loads;
        based on conducting the supply of power to the lighting load, obtaining electrical current data representing properties of electrical current through the lighting load over a duration of time;
        applying the machine learning model, using the obtained electrical current data representing properties of electrical current through the lighting load, to classify the lighting load; and
        performing processing based on the applying, wherein the performing processing comprises configuring the dimmer with one or more dimmer operating parameters that control operation of the dimmer, wherein the applying fails to classify the lighting load into any lighting load class of the plurality of different lighting load classes, and wherein the performing processing comprises sending the obtained electrical current data to a remote entity.

2. The dimmer of claim 1, wherein the machine learning model is an initial machine learning model, and wherein the performing processing further comprises:
    receiving, in response to the sending, an updated machine learning model;
    using the updated machine learning model, repeating the applying to classify the lighting load, wherein the repeating the applying classifies the lighting load into a lighting load class indicated by the updated model;

identifying, based on the lighting load class indicated by the updated model, the one or more dimmer operating parameters; and performing the configuring the dimmer with the identified one or more dimmer operating parameters.

3. The dimmer of claim 1, wherein the performing processing further comprises:

receiving, in response to the sending, an indication of a class of the lighting load;

identifying, based on the lighting load class indicated by the updated model, the one or more dimmer operating parameters; and performing the configuring the dimmer with the identified one or more dimmer operating parameters.

4. A dimmer for controlling conduction of a supply of power to a lighting load, the dimmer comprising:

a line input terminal and a load output terminal, the line input terminal configured to be electrically coupled to the supply of power, and the load output terminal configured to be electrically coupled to the lighting load;

a switching circuit electrically coupled in series between the line input terminal and the load output terminal, the switching circuit configured to be selectively controlled between an ON state and an OFF state;

a memory; and a processing circuit in communication with the memory, wherein the dimmer is configured to perform a method comprising:

obtaining a machine learning model, the machine learning model configured for classifying lighting loads into a plurality of different lighting load classes based on properties of electrical current through the lighting loads;

based on conducting the supply of power to the lighting load, obtaining electrical current data representing properties of electrical current through the lighting load over a duration of time;

applying the machine learning model, using the obtained electrical current data representing properties of electrical current through the lighting load, to classify the lighting load; and performing processing based on the applying, wherein the performing processing comprises configuring the dimmer with one or more dimmer operating parameters that control operation of the dimmer, wherein the applying fails to classify the lighting load into any lighting load class of the plurality of different lighting load classes, and wherein the performing processing comprises selecting a default one or more dimmer operating parameters as the one or more dimmer operating parameters with which to configure the dimmer.

5. A dimmer for controlling conduction of a supply of power to a lighting load, the dimmer comprising:

a line input terminal and a load output terminal, the line input terminal configured to be electrically coupled to the supply of power, and the load output terminal configured to be electrically coupled to the lighting load;

a switching circuit electrically coupled in series between the line input terminal and the load output terminal, the switching circuit configured to be selectively controlled between an ON state and an OFF state;

a memory; and a processing circuit in communication with the memory, wherein the dimmer is configured to perform a method comprising:

obtaining a machine learning model, the machine learning model configured for classifying lighting loads into a plurality of different lighting load classes based on properties of electrical current through the lighting loads;

based on conducting the supply of power to the lighting load, obtaining electrical current data representing properties of electrical current through the lighting load over a duration of time;

applying the machine learning model, using the obtained electrical current data representing properties of electrical current through the lighting load, to classify the lighting load;

performing processing based on the applying, wherein the performing processing comprises configuring the dimmer with one or more dimmer operating parameters that control operation of the dimmer;

maintaining the machine learning model as a maintained machine learning model on the dimmer for lighting load classification;

periodically or aperiodically receiving from a remote entity an updated machine learning model as part of a firmware update to the dimmer; and replacing the maintained machine learning model with the received updated machine learning model such that the updated machine learning model becomes the maintained machine learning model for lighting load classification.

6. The dimmer of claim 5, wherein the dimmer further comprises a network interface through which the dimmer is connected to a network, and wherein the obtaining obtains the machine learning model through the network interface from a remote entity connected to the network.

7. The dimmer of claim 5, wherein the different lighting load classes correspond to different lamp types having differing internal circuitry and electrical performance thereof, and wherein the different lighting load classes comprise (i) a class for incandescent lamps, (ii) a class for compact fluorescent lamps, and (iii) more than one class for light emitting diode (LED) lamp types, wherein each LED lamp type of the LED lamp types differs from the other LED lamp types based at least on its drive circuitry, and wherein each class of the more than one class corresponds to the drive circuitry of a respective LED lamp type of the LED lamp types.

8. The dimmer of claim 5, wherein the memory stores programs instructions for execution by the processing circuit to perform the method.

9. A method for controlling operation of a dimmer, the method comprising:

conducting a supply of power to a lighting load;

based on the conducting, obtaining electrical current data representing properties of electrical current through the lighting load over a duration of time;

sending the electrical current data to a remote entity; and based on a classification of the lighting load, the classification being based on the electrical current data, configuring the dimmer with one or more dimmer operating parameters that control operation of the dimmer, wherein the classification is performed by the remote entity based on receiving the sent electrical current data.

10. The method of claim 9, further comprising:
maintaining a database of dimmer operating parameters and associated lighting load classes, each lighting load class of the associated lighting load classes being associated with a respective one or more dimmer operating parameters on a basis that the respective one or more dimmer operating parameters optimizes performance of drive circuitry of lighting loads of that lighting load class to minimize flicker on the lighting load;
receiving from the remote entity an indication of a lighting load class into which the lighting load is classified; and
identifying from the maintained database the one or more dimmer operating parameters with which to configure the dimmer as the one or more operating parameters associated with the lighting load class into which the lighting load is classified.

11. The method of claim 9, further comprising receiving from the remote entity the one or more dimmer operating parameters, the one or more dimmer operating parameters identified based on a lighting load class into which the lighting load is classified.

12. The method of claim 9, wherein the classification of the lighting load comprises a classification into a lighting load class of a plurality of different lighting load classes that correspond to different lamp types having differing internal circuitry and electrical performance thereof, wherein the different lighting load classes comprise (i) a class for incandescent lamps, (ii) a class for compact fluorescent lamps, and (iii) more than one class for light emitting diode (LED) lamp types, wherein each LED lamp type of the LED lamp types differs from the other LED lamp types based at least on its drive circuitry, and wherein each class of the more than one class corresponds to the drive circuitry of a respective LED lamp type of the LED lamp types.

13. A method for controlling operation of a dimmer, the method comprising:
obtaining a machine learning model, the machine learning model configured for classifying lighting loads into a plurality of different lighting load classes based on properties of electrical current through the lighting loads;
maintaining a database of dimmer operating parameters and associated lighting load classes, each lighting load class of the associated lighting load classes being associated with a respective one or more dimmer operating parameters on a basis that the respective one or more dimmer operating parameters optimizes performance of drive circuitry of lighting loads of that lighting load class to minimize flicker on the lighting load;
conducting a supply of power to a lighting load;
based on the conducting, obtaining electrical current data representing properties of electrical current through the lighting load over a duration of time; and
performing a classification of the lighting load, the performing the classification comprising applying the machine learning model, using the obtained electrical current data representing properties of electrical current through the lighting load, to classify the lighting load;
based on the classification of the lighting load, the classification being based on the electrical current data:
identifying from the maintained database one or more dimmer operating parameters that control operation of the dimmer, the identified one or more dimmer operating parameters being identified as the one or more operating parameters associated with the lighting load class into which the lighting load is classified; and
configuring the dimmer with the identified one or more dimmer operating parameters that control operation of the dimmer.

14. A dimmer for controlling conduction of a supply of power to a lighting load, the dimmer comprising:
a line input terminal and a load output terminal, the line input terminal configured to be electrically coupled to the supply of power, and the load output terminal configured to be electrically coupled to the lighting load;
a switching circuit electrically coupled in series between the line input terminal and the load output terminal, the switching circuit configured to be selectively controlled between an ON state and an OFF state;
a memory; and
a processing circuit in communication with the memory, wherein the dimmer is configured to perform a method comprising:
based on conducting the supply of power to the lighting load, obtaining electrical current data representing properties of electrical current through the lighting load over a duration of time;
sending the electrical current data to a remote entity;
based on the classification of the lighting load, the classification being based on the sent electrical current data and the classification being by a machine learning model, receiving from the remote entity an indication of a lighting load class into which the lighting load is classified;
identifying, based on the indication of the lighting load class, one or more dimmer operating parameters that control operation of the dimmer; and
configuring the dimmer with the one or more dimmer operating parameters that control operation of the dimmer.

15. The dimmer of claim 14, wherein the method further comprises:
maintaining a database of dimmer operating parameters and associated lighting load classes, each lighting load class of the associated lighting load classes being associated with a respective one or more dimmer operating parameters on a basis that the respective one or more dimmer operating parameters optimizes performance of drive circuitry of lighting loads of that lighting load class to minimize flicker on the lighting load; and
identifying the one or more dimmer operating parameters with which to configure the dimmer as the respective one or more operating parameters associated with the lighting load class into which the lighting load is classified.

16. The dimmer of claim 14, wherein the classification of the lighting load comprises a classification into a lighting load class of a plurality of different lighting load classes that correspond to different lamp types having differing internal circuitry and electrical performance thereof.

17. The dimmer of claim 16, wherein the different lighting load classes comprise (i) a class for incandescent lamps, (ii) a class for compact fluorescent lamps, and (iii) more than one class for light emitting diode (LED) lamp types, wherein each LED lamp type of the LED lamp types differs from the other LED lamp types based at least on its drive circuitry, and wherein each class of the more than one class corresponds to the drive circuitry of a respective LED lamp type of the LED lamp types.

18. A dimmer for controlling conduction of a supply of power to a lighting load, the dimmer comprising:
- a line input terminal and a load output terminal, the line input terminal configured to be electrically coupled to the supply of power, and the load output terminal configured to be electrically coupled to the lighting load;
- a switching circuit electrically coupled in series between the line input terminal and the load output terminal, the switching circuit configured to be selectively controlled between an ON state and an OFF state;
- a memory; and
- a processing circuit in communication with the memory, wherein the dimmer is configured to perform a method comprising:
  - based on conducting the supply of power to the lighting load, obtaining electrical current data representing properties of electrical current through the lighting load over a duration of time;
  - sending the electrical current data to a remote entity;
  - based on a classification of the lighting load, the classification being based on the sent electrical current data and the classification being by a machine learning model, receiving from the remote entity one or more dimmer operating parameters that control operation of the dimmer, the one or more dimmer operating parameters identified based on a lighting load class into which the lighting load is classified; and
  - configuring the dimmer with the one or more dimmer operating parameters that control operation of the dimmer.

* * * * *